United States Patent [19]

Borrey et al.

[11] Patent Number: 5,159,667
[45] Date of Patent: Oct. 27, 1992

[54] DOCUMENT IDENTIFICATION BY CHARACTERISTICS MATCHING

[76] Inventors: Roland G. Borrey; Daniel G. Borrey, both of 19251 Canyon Dr., Villa Park, Calif. 92667

[21] Appl. No.: 359,839

[22] Filed: May 31, 1989

[51] Int. Cl.$^5$ .......................... G09C 1/00; G01L 1/06
[52] U.S. Cl. .................................... 395/148; 395/934
[58] Field of Search ... 364/200 MS File, 900 MS File, 364/513, 518; 382/46

[56] References Cited

U.S. PATENT DOCUMENTS

| | | | |
|---|---|---|---|
| 4,633,507 | 12/1986 | Cannistra et al. | 382/46 |
| 4,831,447 | 5/1989 | Lake, Jr. | 382/46 |
| 4,835,690 | 5/1989 | Gangarosa et al. | 364/513 |
| 4,866,784 | 9/1989 | Barski | 382/46 |
| 4,881,178 | 11/1989 | Holland et al. | 364/513 |
| 4,965,763 | 10/1990 | Zamora | 364/419 |

OTHER PUBLICATIONS

Nazif, Ahmed M. et al. "Low Level Image Segmentation: An Expert System", IEEE Trans. on PAMI, vol. PAMI-6, No. 5, pp. 555-577.

Matsuyama, Takashi, "Expert Systems for Imgage Processing: Knowledge-Based . . . Processes", Computer Vision, Graphics and Images Proc., 48:22-49 (1989).

Thonnat, M. et al., "An expert system for automatic classification and desc. of zooplanktons from monocular images", 9th Internl. Conf. on Pattern Recognition, 14-17 Nov. 1988, pp. 114-118.

Primary Examiner—Stuart N. Hecker
Assistant Examiner—Rebecca L. Rudolph
Attorney, Agent, or Firm—Christie, Parker & Hale

[57] ABSTRACT

This invention relates to an automatic identification method for scanned documents in an electronic document capture and storage system. The invention uses the technique of recognition of global document features compared to a knowledge base of known document types. The system first segments the digitized image of a document into physical and logical areas of significance and attempts to label these areas by determining the type of information they contain, without using OCR techniques. The system then attempts to match the areas segmented to objects described in the knowledge base. The system labels the areas successfully matched then selects the most probable document type based on the areas found within the document. Using computer learning methods, the system is capable of improving its knowledge of the documents it is supposed to recognize, by dynamically modifying the characteristics of its knowledge base thus sharpening its decision making capability.

5 Claims, 16 Drawing Sheets

Fig. 1
GENERAL FLOW DIAGRAM

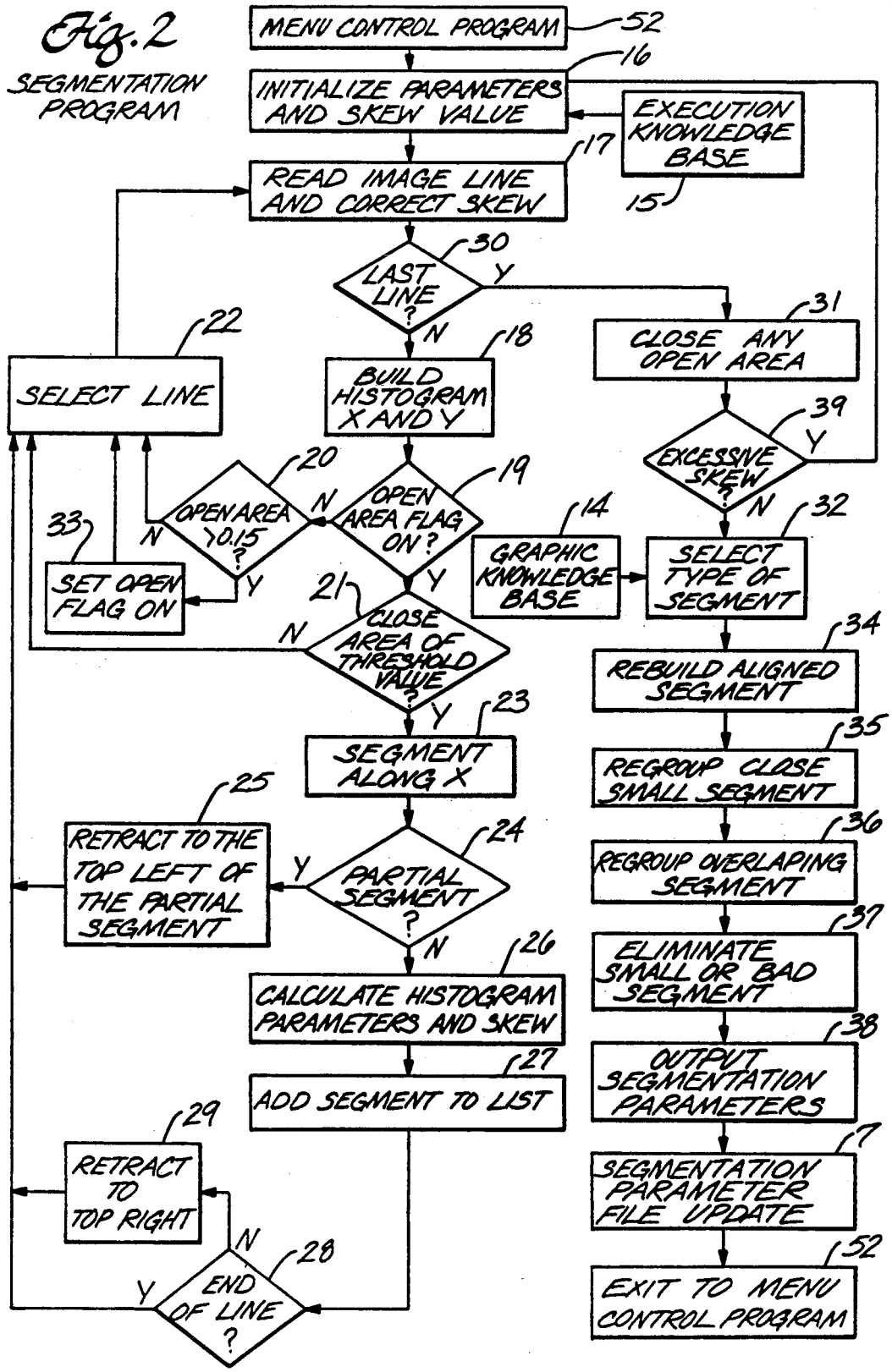

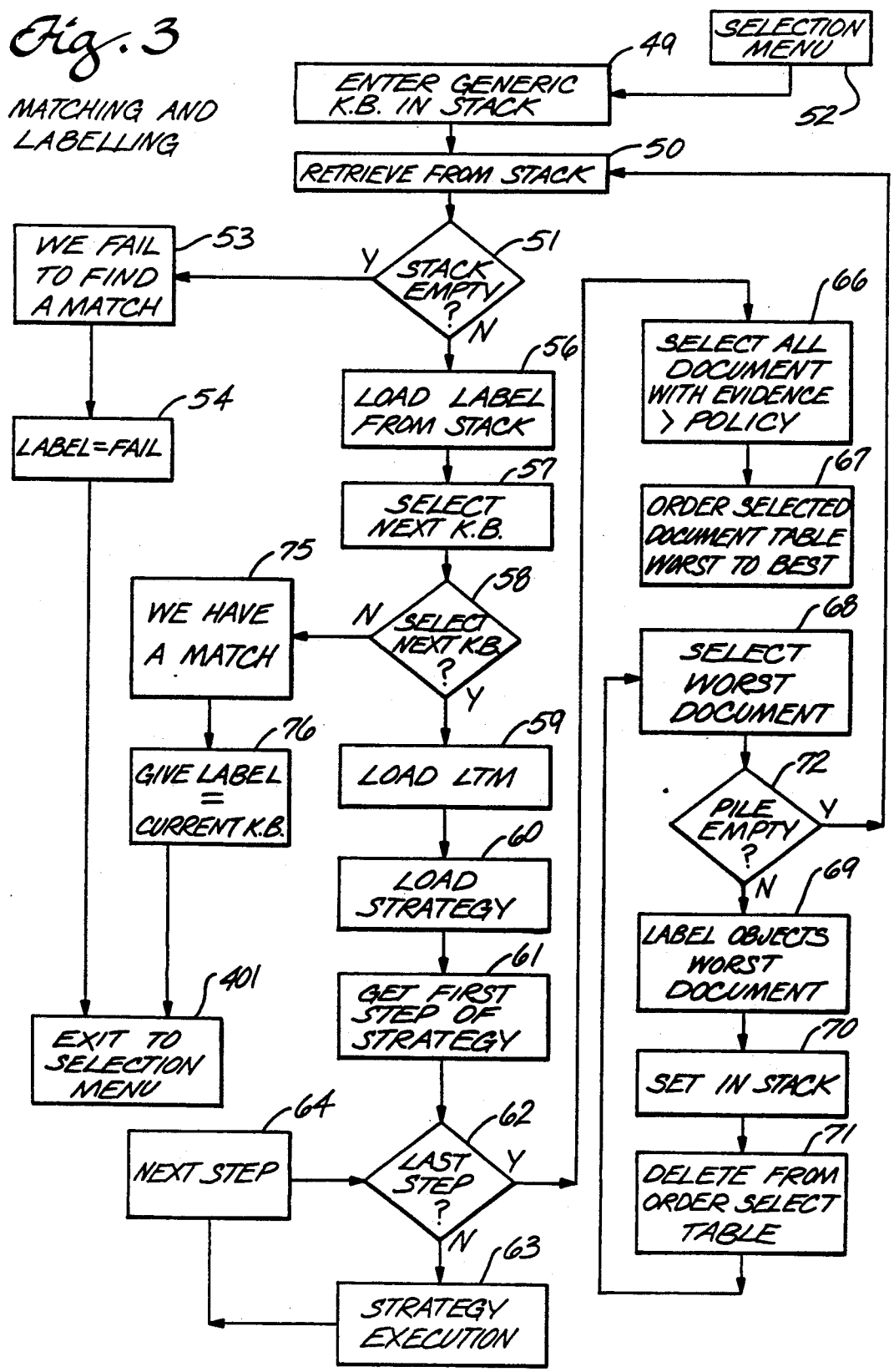
Fig. 3 MATCHING AND LABELLING

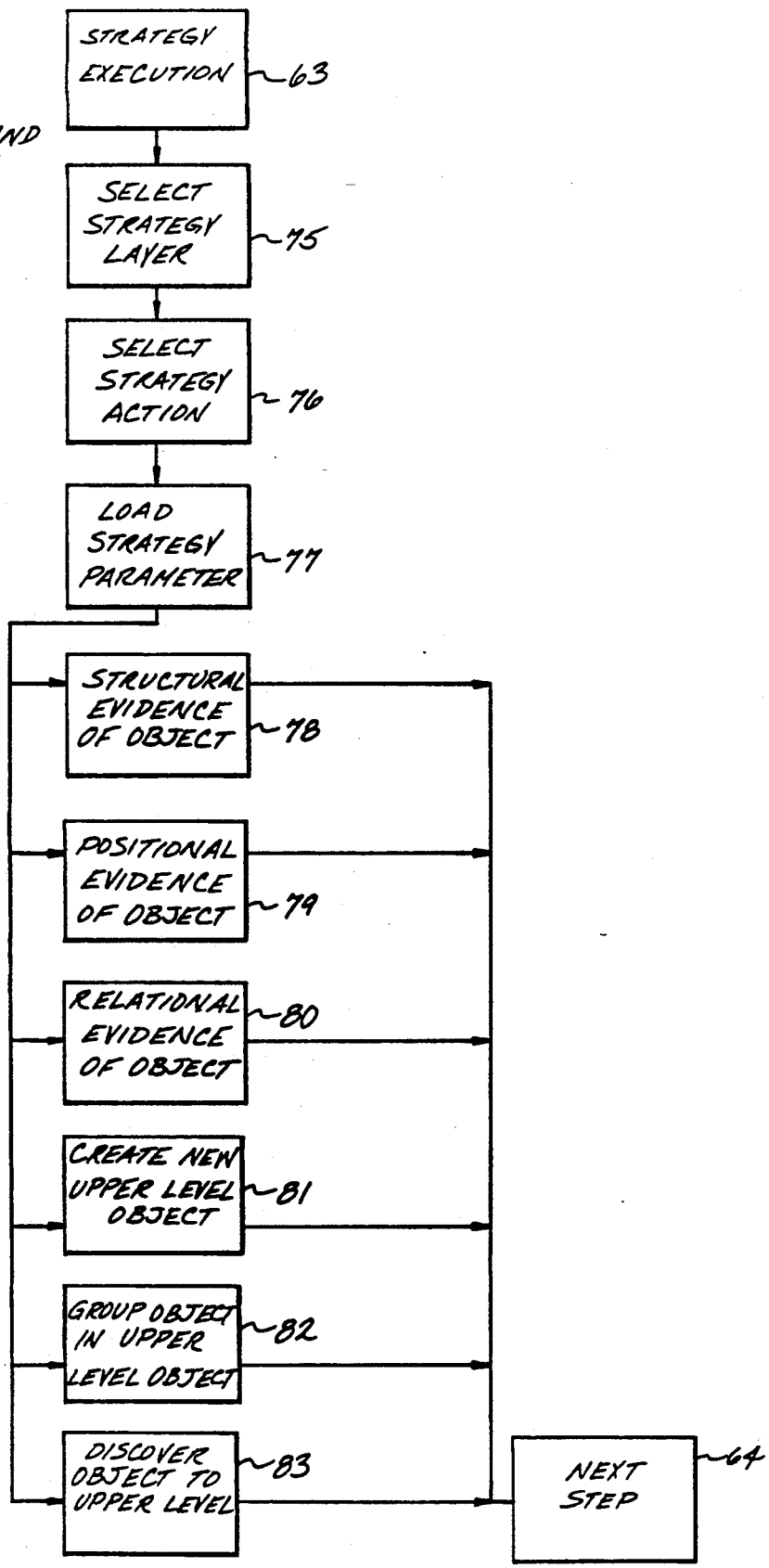

ACTIONS FOR BUILDING EVIDENCE

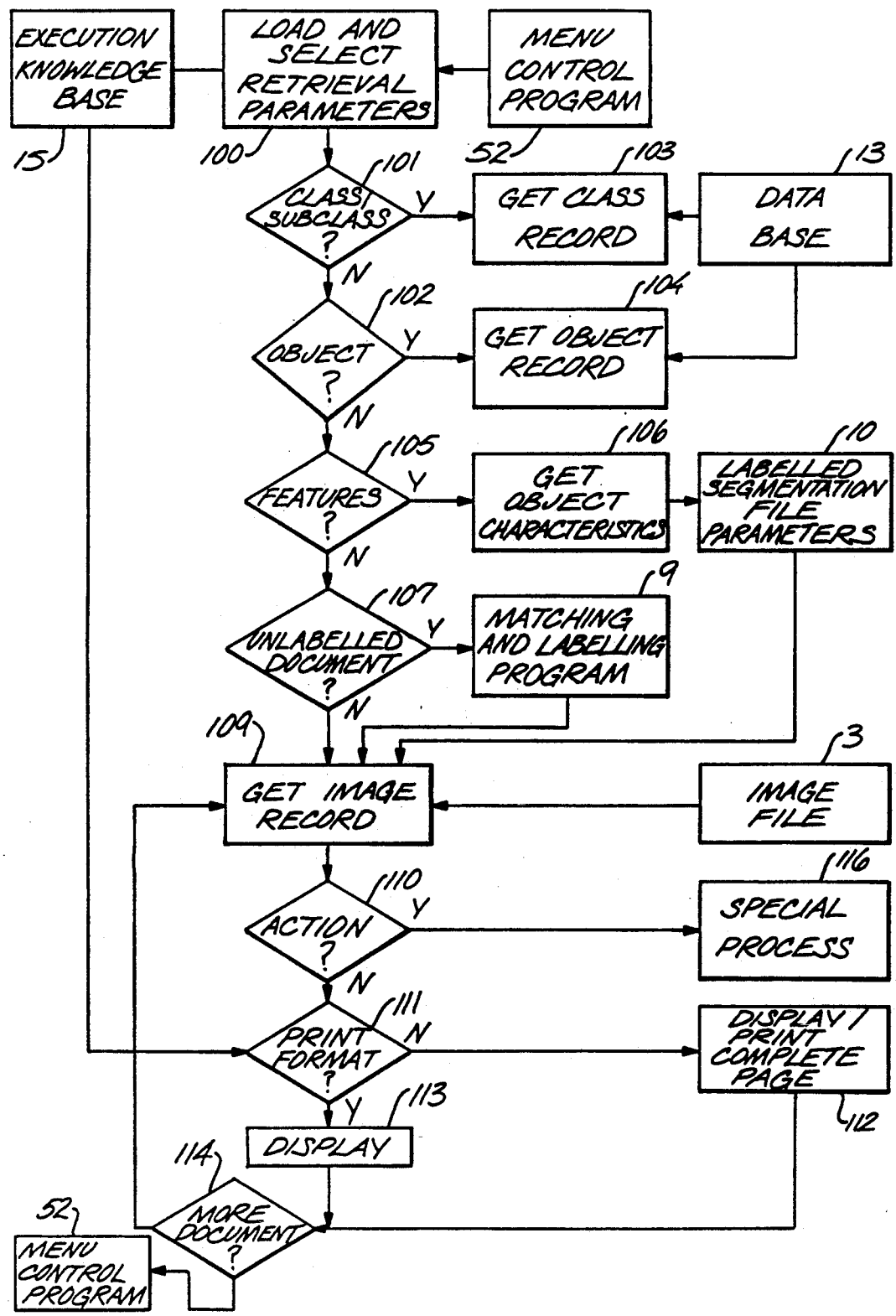

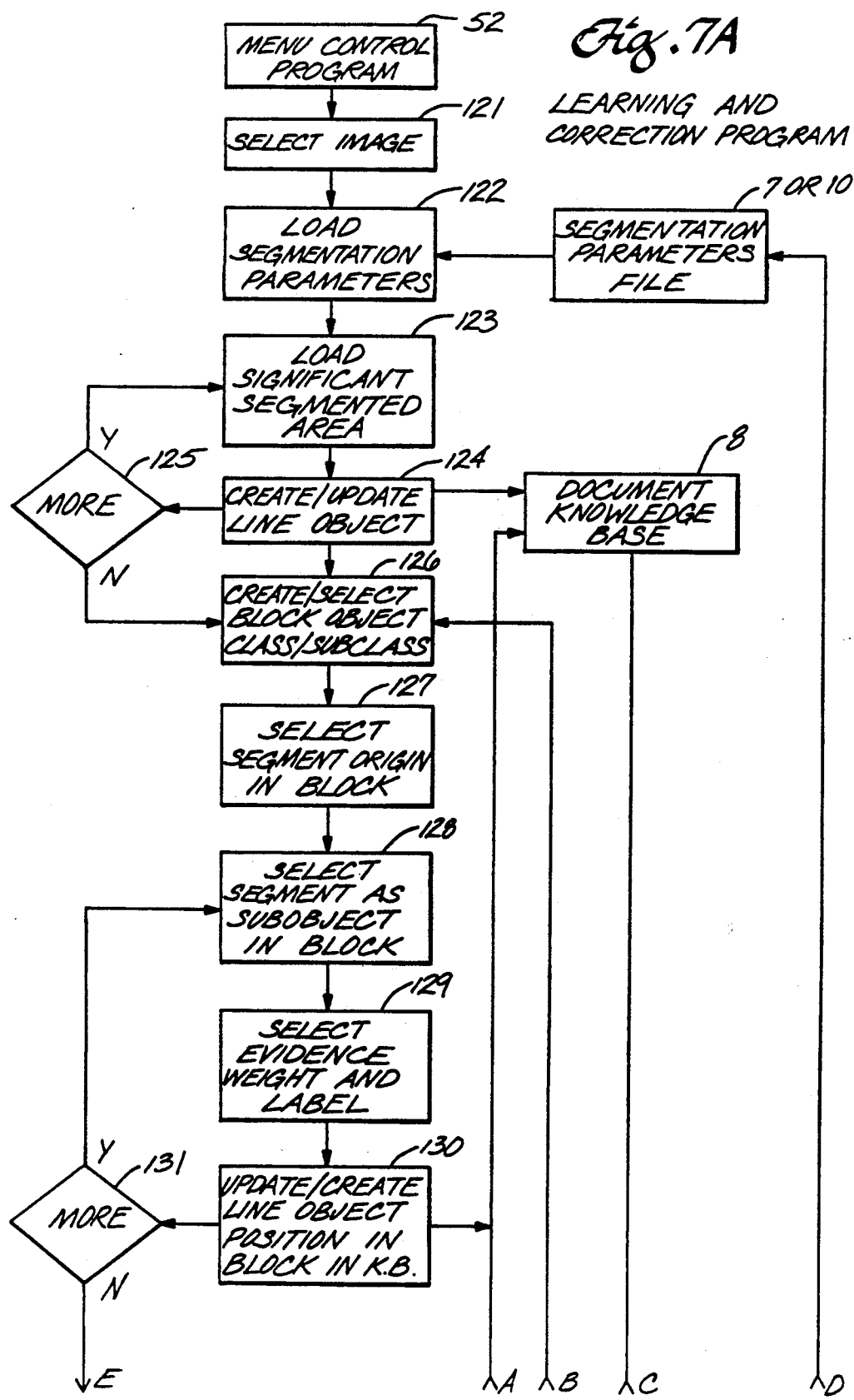

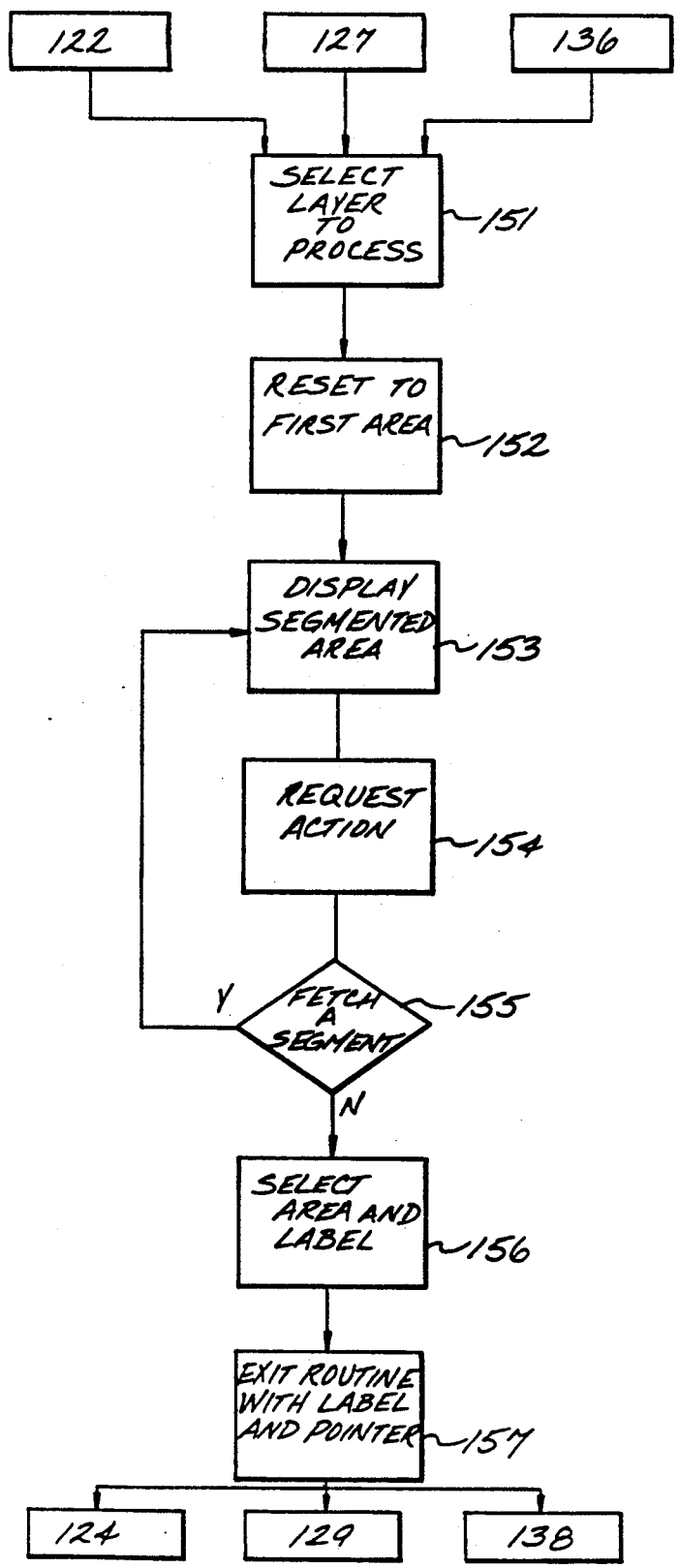

DAY, BERRY & HOWARD

Counsellors at Law
Boston, Hartford and Stamford

One Post Office Square
Boston
Massachusetts 02109-0103
Telephone (617) 451-8166
Telex 99324

January 4, 1985

Hank Allard
P.C. Consultants, Inc.
6 New England Executive Park
Burlington, Massachusetts 01803

Re: Image Peripherals, Inc.

Dear Mr. Allard:

Enclosed are the most recent set of bank statements.

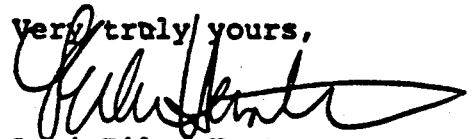

Very truly yours,

Lori Eiler-Hunter
[Secretary to Thomas D. Gill, Jr.]

leh

Enclosure

FIG. 10

DOCUMENT IDENTIFICATION BY CHARACTERISTICS MATCHING

BACKGROUND OF THE INVENTION

The present invention relates to a method for the automatic identification of scanned documents in an electronic document capture and storage system.

In electronic document scanning systems, a page of a document is illuminated then scanned using one of several existing techniques such as a charged coupled device (CCD) to create a digital image representing a matrix of the black and white points on the page by a matrix of 0's and 1's. This matrix is then transmitted to a digital computer where it can be processed, displayed, identified and stored. In some applications the complete digital image of the document is stored. In other applications the results of an additional process such as optical character recognition (OCR) permits the text contained on the document to be stored instead of the full image of the document.

In all cases, however, the document must be identified for later retrieval and this step currently requires manual intervention. A data input operator normally identifies and provides indexing information for each page of the document as it is entered into the system. Because it is a manual step, identifying and indexing documents comprise the largest operating expense of most electronic document capture and storage systems. This expense limits the benefits of such systems in many applications because of its high cost.

In a typical application, a data entry operator will enter the identification of each page of a document into the data base of a system after the page is scanned. This identification may be composed of as few as five or six numbers or characters, but often is of significantly greater length to properly identify the page and allow an efficient retrieval search of the document at a later time.

Document identification and indexing information usually consists of the document class (e.g., letter, invoice, credit application, etc.) and a combination of numeric and alphanumeric characters which uniquely identify this document within its class (e.g., name of the party sending the letter, vendor invoice number, etc.). Additionally, certain "key words" may be added to allow a group of documents within the class to be simultaneously retrieved (e.g., subject of the letter, type of merchandise ordered, etc).

To achieve such data entry in a reasonably efficient manner, documents are often prepared in advance for data entry operators by manual sorting, pre-encoding, highlighting key fields or other techniques to guide the flow of the data entry operation.

In applications with standardized documents such as processing Internal Revenue Service forms, automated processing for sorting and data entry is possible. In such cases OCR processing has been successfully used to identify documents created with well known fonts. However, the vast majority of documents processed by document capture and storage systems do not have such standardized formats or well known OCR readable fonts.

There is a need, therefore, for a method of automating the document identification and indexing steps of document capture and storage systems. The method must have sufficient flexibility to handle non-standardized document formats as well as varying types of printed fonts, images or handwritten characters.

SUMMARY OF THE INVENTION

The present invention is a method for automatic identification of scanned documents in an electronic document capture and storage system. Document identification is accomplished by a series of programming techniques which recognize as similar, patterns found in a given document. These patterns include overall document structure as well as probabilities of the presence or absence of certain data.

Most documents used in government, the professions or in commerce can be divided into a limited number of classifications. Within a class, such as business letters, the documents will contain some similar types of information (referred to herein as objects). However, this information is not presented in a standard format. For example, within the class of business letters most will have objects which can be labeled as a letterhead, a date, a destination, text, a signature or the originator's name. Likewise, within the class of invoices most will have a buyer, a seller, an invoice number, a date and an amount to be paid. But each document within a class will normally have its objects placed in differing locations.

In order to identify a document, the system first segments the digitized image of the document into physical and logical areas of significance and attempts to label these areas by determining the type of information they contain. The present invention accomplishes this without using the OCR techniques of the prior art.

Using a multiple-pass approach to the characterization of the document, the system attempts to match the segmented areas of the document to predetermined objects described in its document knowledge base.

The document knowledge base contains structured information relating to various classes of documents and the objects they each contain. This knowledge base provides the system with the expected structure and content of the documents which may be identified by the system. For each segmented area on the document an object label is assigned to the area by matching its structural characteristic, i.e., the physical location of the area on the document, and its relational characteristic, i.e., its location with respect all the other areas on the document, against the expected physical and relational characteristics provided by the knowledge base. As a result of this matching process, a table of evidence and disevidence is built for each area as containing a particular object. Based on the evidence and disevidence table, proposed object labels are assigned to the segment areas and a proposed classification designation is assigned to the document. The program then begins a verification pass through the document. Using the proposed object labels and document classification, the structural and relational characteristics of the areas are again compared. If the results of the second-pass is the same as the first-pass, the object labels and document classification are considered verified. If the results are different, new labels are proposed and the verification step is repeated. After successful verification, the system then begins another pass to attempt to match further document characteristics in order to identify a possible sub-class of the document within the selected document class. Once the document class and possibly its sub-class as well as the objects it contains are adequately classified, this information is stored for later retrieval.

The system has the capability to retrieve, display and print the contents of entire documents or just identified objects within a document. The system's capability to retrieve and extract specific objects from a document rather than displaying only the entire document makes it practical to use significantly lower resolution CRT screens than required with prior art document retrieval systems.

An important feature of the system is the ability to associate a labelled object with its exact position in an image when in either uncompressed or compressed format. This feature significantly reduces the amount of data that must be transferred from the storage device to the display device, enhancing the system performance and making it practical to use software decompression algorithms at the display station.

Another significant feature of the system is its use of a skew correction technique on scanned document images or specific objects to increase its accuracy in properly classifying documents and identifying their objects.

Another feature of the system is its capability to improve its document knowledge base based on the results of the operation of the system. New rules are automatically added to this knowledge base regarding novel classes and subclasses of documents. Decision making is improved by making use of fuzzy knowledge techniques. This feature makes the system easily adaptable to new documents as well as new imaging technologies.

Another important feature of the system is the ability to process document based on known information about the environment or application to improve or accelerate the recognition process using an execution knowledge base containing strategy, policy and execution files.

In another embodiment, the system may be used as a pre-processing step to permit Mark-reading or OCR operations on selected areas of non-formatted documents containing unstructured information.

The foregoing and other advantageous and distinguishing features of the invention are described in detail below and are recited in the appended claims.

BRIEF DESCRIPTION OF THE DRAWINGS

FIG. 1 is a computer system operational flow chart depicting the presently preferred embodiment of the invention;

FIG. 2 is a detailed flow chart representing a segmentation program, functional block 6 of the flow chart shown in FIG. 1.

FIGS. 3, 4 & 5 are flow charts depicting a matching and labelling program, functional block 9 of the flow chart shown in FIG. 1.

FIG. 6 is a flow chart depicting a retrieval and execution program, functional block 11 of the flow chart shown in FIG. 1.

FIGS. 7A & 7B is a flow chart depicting a learning and correction program, functional block 12 of the flow chart shown in FIG. 1.

FIG. 8 is a flow chart depicting the procedure used to select an area for labelling at the line, block or page level, functional blocks 123, 128, 137 of the flow chart shown in FIGS. 7A & 7B.

FIG. 10 is an exemplary letter used in describing the operation of the preferred embodiment of the invention shown in FIG. 1.

DETAILED DESCRIPTION

A. Overview of System Operation

Figure 2A:
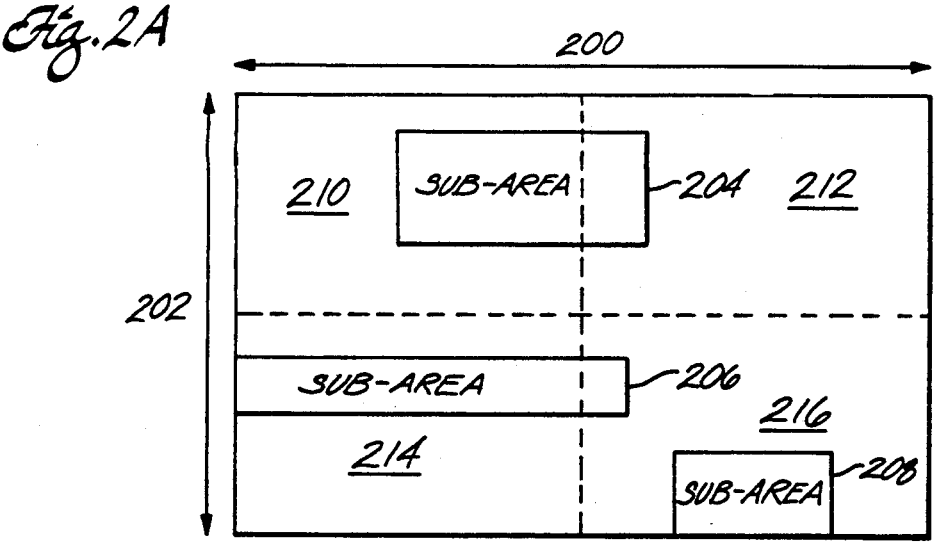
FIG. 2A is a depiction of an segmented area within a document as defined by the segmentation program represented in FIG. 2.

The present invention comprises a computerized system capable of identifying certain documents as well as certain types of information, referred to as objects, contained in these documents. The system performs this identification by matching characteristic portions of the documents with predefined document characteristics contained in a document knowledge base. The identification process is carried out without using OCR, any special identification markings on the document, or any human intervention.

As the current invention addresses a developing field of art, a glossary has been attached to the present application as Appendix A. The glossary defines certain terms which may not, at this time, be in common usage by all those skilled in the art.

Figure 1:
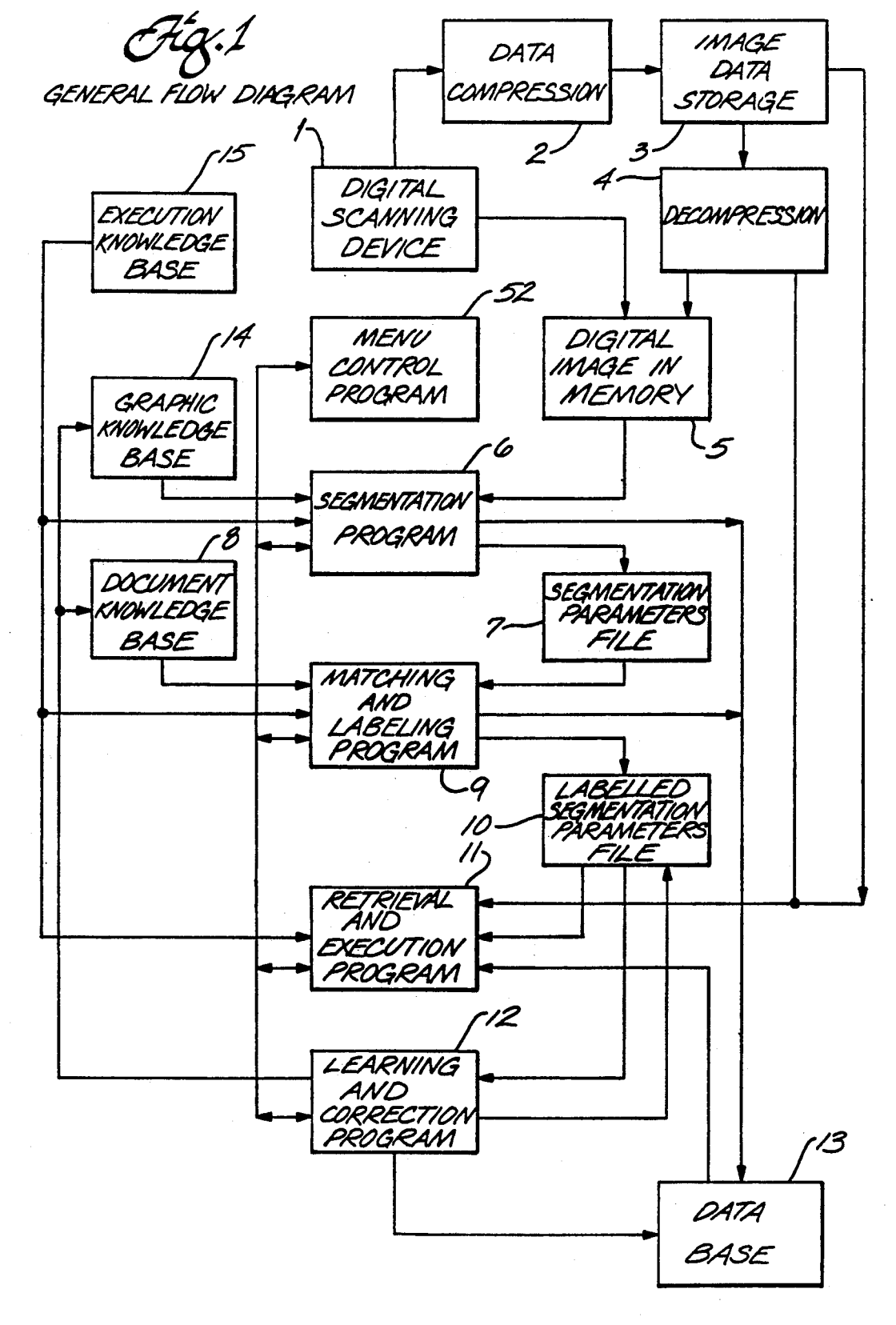

Referring to FIG. 1, a system implementing a presently preferred embodiment of the invention identifies a document and the document's objects using three knowledge bases and four primary programs. The programs are a segmentation program 6 (represented in greater detail in FIG. 2); a matching and labelling program 9 (represented in greater detail in FIGS. 3,4 and 5); a retrieval and execution program 11 (represented in greater detail in FIG. 6); and, 4) a learning and correction program 12 (represented in greater detail in FIG. 7 A and B. The three knowledge bases are a document knowledge base 8, which the system utilizes as a source of document and object identification criteria (described in Appendix D), an execution knowledge base 15, which is used to direct the operation of the system (described in Appendix E), and a graphics knowledge base 14, used to identify handwriting, logos and fonts (described in Appendix F).

Generally, the system begins with the application of a digital scanning device 1 to the document. The output of the scanning device is a data stream containing a digital image of the document in a machine readable form. The data stream may either be compressed 2 and stored 3 for later use after decompression 4 then loaded into a computer system memory 5 or alternatively loaded directly into a computer system memory 5 for processing. The segmentation program 6 divides the document image into segments and identifies their characteristics. The matching and labeling program 9 identifies the document by class and sub-class and labels the objects in the document. This information is then stored in a file in a data base 13. The retrieval and execution program 11 displays the result of the matching and labelling program 9 on a computer screen or printer (not shown). The learning and correction program 12 creates and updates the graphic knowledge base 14 and the document knowledge base 8 which are then used by the segmentation program 6 and the matching and labeling program 9 during the next iteration of the system.

When first starting the system and after each main program is finished, control is returned to a menu control program 52. The operator may direct the system to automatically go to the next program, or he can request to rerun the current batch of documents with different threshold parameters or he can run another batch of documents through the same program.

The system identifies a document by dividing its relevant areas into segments. The structural characteristics, i.e., the segment's physical location of the area on the document, and the relational characteristic, i.e., the segment's location with respect all the other segments in the document are matched against the expected physical and relational characteristics provided by the document knowledge base. The prestored logical representations of these areas of the document within the document knowledge base are called objects.

A knowledge base may be described as a computer file containing information about a problem represented in a structured fashion. In the case of a document knowledge base, the information relates to the structure and characteristics used to identify documents. Knowledge based systems have been used in expert and vision systems as a method of making programs independent of the problem processed and to permit them to be data driven.

In the presently preferred embodiment of the invention, knowledge about the use of the system, as opposed to knowledge about the documents themselves is stored in the execution knowledge base 15. The execution knowledge base is used as a pilot to the programs discussed above, selecting the appropriate program and guiding the system in the best direction for efficient operation. Guidance is provided by focusing the attention of the system on the relevant segments and objects, monitoring the depth of recognition applied to each document and determining the necessary threshold levels needed to make and verify classification decisions. The execution knowledge base is also a feedback mechanism allowing the selection of actions on certain area or documents to be taken automatically by triggering a program upon encountering a prespecified condition.

Each of the above-described programs first reads the execution knowledge base 15 to load its initial parameters or options. These parameters will reduce the search space or the set of all possible solutions, according to the stored knowledge on the specific documents being processed. At the end of each pass through each program, each program consults the execution knowledge base 15 to verify if the current status of the program has triggered a new situation that will modify the search path of the program (i.e the way the program will search to identify documents or document areas by calling the various matching routines), or the conditions of the process (i.e., the level of threshold used in a program to accept a match or selection as successful).

The document knowledge base 8, described in greater detail below and in Appendix D, is used to create a long term memory table (LTM) of known documents and their respective objects. This information is matched with the document image segments in the segmentation program 6 resulting in the application of labels to the segmented areas beginning with the smallest simplest areas up to the area representing the entire document. The table of these labels is stored in a segmentation parameters file 7 which is used to create a short term memory table (STM) for the current document.

The graphic knowledge base 14 contains a description of all the known graphic types that can be found on all the known documents such as typewritten, handwritten, printed, graphic logos, etc., as well as the sub-classes for each graphic type, such as particular fonts for typewritten and printed graphics.

A hypothesis for the classification of a document and the labeling of its objects is built using global blackboard representation within the matching and labeling program 9. This program then uses fuzzy logic methods to evaluate proposed matches between objects and areas.

Global blackboard representation, well known in the art, is a way of representing and controlling knowledge in a computer model when search paths are unpredictable and where knowledge is presented in several layers representing levels of specificity of the description. For further information regarding this technique see: A. R. Hanson and E. M. Riseman, "Segmentation of Natural Scenes," in *Computer Vision Systems*, (A. Hanson and E. Riseman, Eds.), Academic Press, N.Y., 1978, which is incorporated herein by reference.

Fuzzy logic methods, are also well known and are used when objects are not represented by a finite number but rather a distribution of variations as used in pattern recognition techniques. The rules of inference are approximate rather than exact in order to manipulate information that is incomplete or imprecise. In the case of the present system, objects can have a whole range of possible size, location physical relationships, and are represented by a distribution of possible numbers. For further information regarding fuzzy logic methods see Abraham Kandel, *Fuzzy Mathematical Techniques*, Addison-Wesley Publishing Co., Reading, Mass., 1986, which is incorporated herein by reference.

Having introduced the operation and interrelationship of the three knowledge bases and the four major programs of the system, a description of the operation of these knowledge bases and programs follows below.

B. Knowledge Base and Program Operation

Referring again to FIG. 1, a document is scanned using a digital scanning device 1. The scanning device converts the visual image of the document into a digitized image comprised of matrix of bits which are ON or OFF, representing, respectively, black and white points of the documents visual image. This matrix of bits is sent scanline by scanline through an appropriate interface to a general purpose computer memory 5. The resolution of the scanned image is significant only to the extent that higher resolutions will slow the process. The digital image can be optionally compressed 2 and stored as data 3 for use at a later time. When stored, the data is decompressed 4 before being placed in memory 5. The decompressed data digital image may additionally be used by the retrieval and execution program 11 to provide a visual display of the document on a CRT screen.

Images from digital scanning devices which use several bits to represent levels of gray or color for each point on the visual image require filtering through a thresholding routine in the segmentation program 11 to reduced the digital image to a black and white binary image. As this is well known in the art it is not described here. The segmentation program 6, which is described in greater detail below, processes the binary image scanline per scanline to determine areas of significance. Each area having significant black pixel content will be isolated and its structural and relational characteristics will be extracted. The program operates in a bottom up fashion beginning by isolating individual words or symbols, then groups words in text lines.

The segmentation parameters of each segmented area, such as width and height, X and Y coordinates of its location, black pixel density, texture, the number of sub-areas and the address of the area in the compressed image file are calculated. The type of graphics in the segmented area are matched with the known graphic types in the graphic knowledge base 14 and the results are stored in a segmentation parameters file 7.

In an alternate embodiment of the invention, the above segmentation process is achieved by vectorization of the binary image, producing, when expanded in binary form, the same results for storage in the segmentation parameters file 7 as provided by the segmentation program 6.

The segmentation parameters file 7 contains the short term memory table (STM) information for the document. The initial results stored will become the lowest layer of the document structure.

The segmentation program also initializes a file for the document under consideration by creating a new record with an "undefined" label in the data base 13.

The document knowledge base 8, contains the long term memory table (LTM) information of the system as a structure of three or more layers for each known document. Each layer represents a logical level in the structure of a document, the lowest layer describing the most elementary object and the highest layer describing the most complete object. The objects are described by their physical representation, their complexity and how they appear to the operator of the system. For use of the current invention for the identification of documents the layers may be defined as follows:

The lowest layer is a word containing several characters;

The next higher layer is a line containing several words;

The next higher layer is a block containing several lines;

The next higher layer is a page containing several blocks;

The next higher layer is a document containing several pages; and

The highest layer is a folder contains several documents.

The number of layers used is not fixed but it has been found that a minimum of three layers is needed for the system to function satisfactorily. In the presently preferred embodiment of the invention, three layers are used comprising a page layer, a block layer and a line layer. Because the present system embodiment limits the size of a document to one page, the words "page" and "document" are used interchangeably in this description.

The document knowledge base 8 contains information relative to pages, blocks and lines of known documents together with their structural and relational characteristics, each located in their respective layers.

The matching and labeling program 9 attempts to match the characteristics of each segmented area of the document stored in the segmentation parameters file 7, with those of the objects described in the document knowledge base 8, layer by layer, from the bottom up. In order to avoid the combinational explosion which would result from attempting to match all characteristics of all segmented areas with all characteristics of all objects for all layers, a focus of attention method is applied in the matching and labeling program in a top down manner. Matching attempts are made only with objects possessing sufficient structural evidence at both the highest layer and the current processing layer. This method is well known in the art and is used in artificial intelligence programs as a control mechanism when exploring complex problems with numerous possible paths. It limits path selection by determining and selecting the path that has the best chance of being successful. For further information on focus of attention methods see *The Handbook on Artificial Intelligence,* Vol III (P.R. Cohen & E. A. Feigenbaum, Eds.), HeurisTech Press, Stanford, 1982, which is incorporated herein by reference.

A focus of attention control routine is used by the matching and labeling program 9 whenever a decision is needed of what to do next. When a layer of the document knowledge base has been processed, the focus of attention routine will consult the execution knowledge base 15 to verify if the result of the current process has created a condition that requires a change to one of the other strategies described in the execution knowledge base.

A successful match is found when the characteristics of a segmented area from the segmentation parameters file 7 are sufficiently similar to the characteristics of an object in the document knowledge base 8, provided the match is not contradicted by another relation in another layer of the document knowledge base. Stated differently, a match is found when characteristics matching by the matching and labeling program 9 has accumulated enough evidence that the area under analysis is the object to which it is matched, using fuzzy logic mathematics.

Fuzzy logic is an approach to approximate reasoning in which truth values, in this instance regarding the matching of area and object characteristics, are defined as possibility distributions that carry linguistic labels such as very true, true, not very true, not true, etc. A range of numbers are used to quantify these imprecise evidences. A value above a determined threshold is considered as an acceptable match. Threshold values are determined by the policy file of the execution knowledge base or set by default.

Once an acceptable match is found between an area and an object, a preliminary label is assigned to the area 10 and temporarily stored in the labeled segmentation parameter file 10. This preliminary label is, subject to verification at an upper layer of the Document knowledge base 8 by matching the areas's structure with the structure of the class and sub-class selected for the document.

Data base 13 is updated by the matching and labeling program 9 with all the finally determined labels of the areas, the access parameters of the areas, and the class and sub-class of the document.

The retrieval and execution program 11 retrieves and displays all or selected areas of documents. Retrieval is accomplished by searching through the data base 13 for a match on a requested document class or sub-class, or for a match on a document or area characteristic. Images of documents can be displayed completely or objects representing areas of the document can be selected and displayed. The retrieval and execution program 11 accesses the execution knowledge base 15 for selective display information, the labelled segmentation parameters file 10 for specific coordinates of the areas to display, and the data base 13 for classification parameters and digitized document images.

Since all possible documents and all possible objects in these documents cannot be known in advance, knowledge bases 8 and 14 require periodic updating. This is accomplished by the learning and correction program 12. This program relieves the operator of the system from having to manually create and update the objects in the document knowledge base 8. All structural and relational characteristics of new selected object are automatically calculated and written in document knowledge base 8. All new or modified graphic types found are described and saved in the graphic knowledge base 14.

When a system operator creates a new object which may have one or more sub-objects in various positions, the learning and correction program 12 will automatically calculate the relations and create the appropriate entry in the knowledge base for this object 8.

The learning and correction program 12 also will automatically create unidentified sub-classes of objects corresponding to common criteria. The program requests the assignment of a label to that sub-class from the operator, then labels all objects classified with that criteria.

Having concluded a general description of the operation of the four main programs, the three knowledge bases and the other components of the currently preferred embodiment of the invention, a description of greater detail of the programs and knowledge bases follows below.

C. The Segmentation Program

FIG. 2 shows a detailed flow of the operation of the segmentation program shown as functional block 6 in the General Flow Diagram of FIG. 1.

Generally, the segmentation program processes the digitized image of a page into separate segmented areas containing sufficient black pixels to be significant and then extracts their structural characteristics. The separation is achieved by building the X and Y histograms of the scanlines and determining the beginning and end of areas of significance by comparing the histogram values with minimum threshold values. The histograms are first-order statistics of the frequency distribution of black pixels over a section of the selected area of the page in both vertical and horizontal directions. The structural characteristics of each segmented area consists of its height, width, density, number of sub-areas, calculated textural features and the resulting graphic type of the area. Dimensions are represented in absolute real measurement, density is the ratio of the number of black pixels found in the area over the maximum number of pixels. The concept of textural features, well known in the art, is used to discriminate segmented areas. Textural features are extracted by calculating the ratio of pixels histograms in various sections of the area. For a further discussion of textural features see *The Handbook of Artificial Intelligence*, Vol. III, Ibid. Any number of textural features can be used, but four histograms ratios representing the four quadrants of each segment have been found acceptable. The ratios are, left and right top to left and right bottom, top and bottom left to top and bottom right, top left to bottom right and top right to bottom left.

The graphic type of an area depends on its structural characteristics. Graphic types are assigned descriptions in the graphic type knowledge base 14. Several standard types have been used, but additional types can be added if a finer knowledge of the type characteristics of an area is required. Currently used descriptions are: printed text, handwriting, typewritten, signature, graphic, photographic, black, horizontal, vertical, small and large.

A typical area segment is depicted in FIG. 2A. The segment has a width direction represented by 200, a height direction represented by 202, and three sub-areas, 204, 206 and 208. The segment is divided into four quadrants by dashed lines. The quadrants are top left 210, top right 212 bottom left 214 and bottom right 216.

The histogram ratios for the entire area segment are compiled by the application in the above described ratios of the histogram totals for each of the sub-areas. The histogram totals are calculated for that portion of the height and width of each sub-area which is located in each quadrant. For example, the height and width measurements for sub-area 204 are taken for that portion of the sub-area which extends into each of the quadrants 210, 212, 214 and 216. It can be seen that nonzero measurements would exist only in quadrants 210 and 212. The histogram totals are, nevertheless, calculated for all quadrants using the height and width portions of the sub-area measured in each quadrant. In this example the ratios would be calculated substituting the total for each quadrant in the following ratio formulas: (210+212)/(214+216), (210+214)/(212+216), 210/216 and 212/214. Six ratios, three based on the height of the sub-area in each quadrant and three based on the width of the sub-area are generated. This process is repeated for each sub-area in the area segment. The compilation of all these ratios provides the parameters of the textural features of the area segment.

For the lowest layer of the document, each area segmented corresponds to a word or a symbol. Horizontally compatible sub-areas are grouped together on the assumption that, such that they are words contained in lines of text.

A count of characters contained in the words is done by statistical computation, without actually identifying the characters' exact location. In another embodiment of this invention, a lower layer segmentation is performed for individual characters to permit post system processing of the document by an OCR system.

Figure 2B:
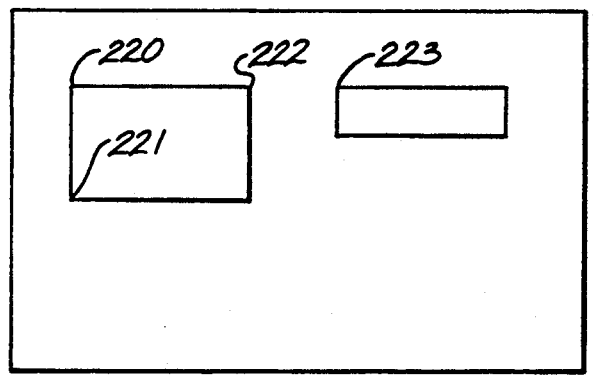
FIG. 2B is a depiction of the segmentation of a page created by the operation of the segmentation program represented in FIG. 2.

A further description of the operation of the segmentation program follows with reference to FIGS. 2 and 2B. The description corresponds to the segmentation of a single scanned page. A digital image has been stored in the computer memory 5.

In order to improve the quality of the segmentation process, the image is processed to reduce the skew by one of several possible methods. The method used in the presently preferred embodiment of the invention is set forth below and in further detail in Appendix B. Generally it consists of correcting the skew on each line scanned with a value calculated by the program.

Referring to FIG. 2B, a page is segmented in a top down and left to right fashion. The program first searches in vertical direction until it detects the end of an area, then it segments that area in the horizontal direction. The segmentation program 6 then fetches the document scanline per scanline and determines if the scanline contains relevant information by checking the number of dark pixels in the scanline against a minimum threshold number. If that threshold is reached, an open area trigger is set 220. Further scanlines are fetched by the program until the number of dark pixels in a scanline falls below a minimum value. The program then closes the vertical segmentation for the area 221. The process is then repeated for the horizontal axis. When the number of dark pixels on the scanline drops below a minimum threshold, it indicates the end of a segmentation area 222.

If the entire line has not been segmented, the program continues its search on the horizontal axis for another area to segment 223. Referring now to FIG. 2, the program begins the segmentation by initializing all housekeeping parameters including resetting histograms values to zero, repositioning a position pointer to the first line, resetting open and close threshold parameters, resetting scanline width to scan full document width, loading from the execution knowledge base 15, needed execution parameters such as levels of threshold to be used by the program, number of lines to segment, depth of the segmentation, resolution of the images to segment, orientation of the segmentation process, the known structural characteristics of the documents to be processed such as the minimum size and shape of area to segment and scanner generated or default skew value 16.

Execution parameters restrict the program to the parameters provided in order to accelerate the segmentation process and simplify the matching and labelling process later.

The segmentation program scans the page in memory 5 scan line by scan line and adjusts the line with the skew parameter from the execution knowledge base 15 or the calculated skew 17. The program calculates two tables of information referred to as the horizontal and vertical histograms. The tables are referred to as histograms after the way in which they may be displayed.

Figure 2C:
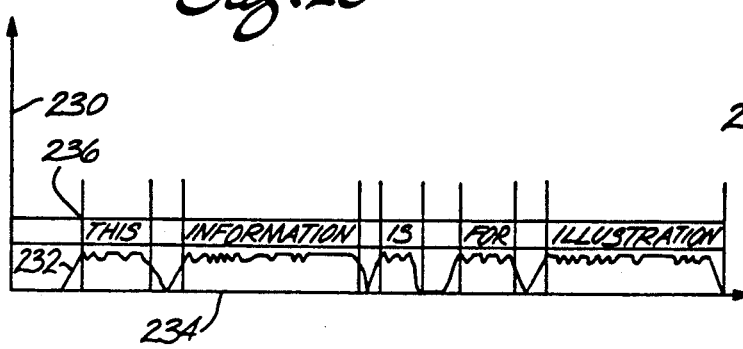
FIG. 2C is a depiction of an exemplary horizontal and histogram created by the operation of the segmentation program represented in FIG. 2.
Figure 2D:
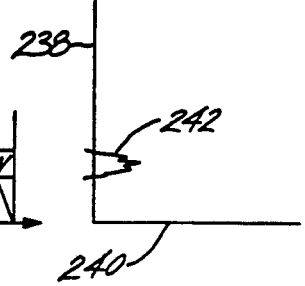
FIG. 2D is a depiction of an exemplary vertical and histogram created by the operation of the segmentation program represented in FIG. 2.

Exemplary horizontal and vertical histograms are illustrated in FIGS. 2C and 2D for the line of text "This information is for illustration". In FIG. 2C the horizontal axis 234 represents the horizontal extent of the scanline. The vertical axis 230 represents the sum of all the dark pixels found at each location represented on the horizontal axis. The sentence "This information is for illustration" translates to a set of data points representing the number of dark pixels located in small vertical slices of the characters making up the sentence. A connected line 232 has been drawn approximating these data points. The words of the sentence 236 have been placed above the line 232 to show the correspondence between the data points and the sentence.

An illustration of a vertical histogram may be seen in FIG. 2D. The vertical axis 238 represents the vertical extent of the scanline. The horizontal axis 240 represents the sum of the dark pixels found at each location represented on the vertical axis. The data points for the same sentence as above represent the number of dark pixels located in small horizontal slices through the sentence. A line 242 has been drawn approximating these data points.

Referring again to FIG. 2, the program test 30 determines whether it has reached the last line of the page. If it has, all opened areas are closed 31. If not, the program begins computing the number of black pixels of the scanned line for the entire width of the page and sets this value in the vertical histogram for that scan line. It then adds each pixel of the scan line to the horizontal histogram for the area under consideration 18.

The program tests 19 whether an area is already currently open for segmentation. If an "open area" flag is off, a threshold test 20 on the vertical histogram value is performed to determine whether the current potential area has enough black pixels to be relevant. An "open area" flag is set 33 when the vertical histogram for that scanline reaches a minimum value set by the rules from the execution knowledge base 15. The rule in the presently preferred embodiment of the invention is equivalent by default to a 2.5 mm section of black line or less depending on the width of the area processed. This threshold value is reduced dynamically depending on the width of the area under consideration.

After an "open area" is set the next scanline is read 22. If the "open area" threshold 20 is not reached, a next scanline is fetched 22 and the preceding line is considered empty.

When program "open area" flag test 19 determines an area is already currently open for segmentation, the program will then test if it has reached the end of an area in the vertical direction 21, meaning that vertical segmentation can be performed. A "close area" trigger occurs when the scanline black pixel count is less or equal to 3% of the maximum value for the area identifying a separation between areas on the page. A "close area" trigger will also occur when the histogram reaches a value below 33% of its maximum plus a probability factor that increases as the area height increases. These thresholds are the default values and may be changed by changing the rule in the execution knowledge base 15.

When the end of an area has not been reached, the next scanline line is fetched 22. When the threshold determines a "close area," is triggered the vertical section of the open area is segmented defining a segment of height equal to the distance between the "open area" scanline and the "close area" scanline.

The program then processes the horizontal histogram in the same fashion as for the vertical segmentation using different threshold values segmenting the area horizontally 23. The width of the horizontal segment is then compared 24 to the width of the horizontal histogram checking to determine if the segment is a partial segment. If it is smaller, a new smaller horizontal histogram boundary is set and the scanline position is retracted to the top of the current area 25. If it is equal, then the skew of the segment is calculated 26 and used to correct the histogram parameters. Generally, the skew is determined by calculating the cotangent of the angle between the scan line and the horizontal axis of the page.

Figure 9A:
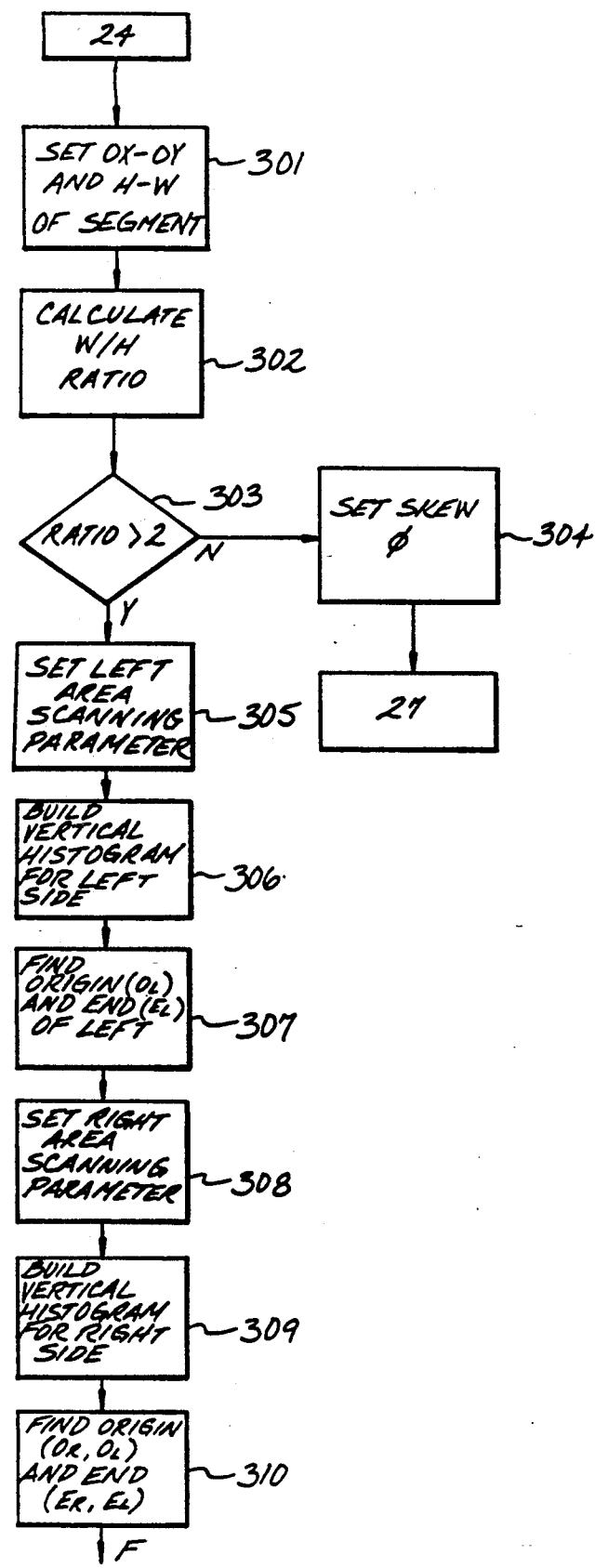
FIGS. 9A & 9B is a flow chart depicting a skew correction program, functional block 26 in FIG. 3.
Figure 9B:
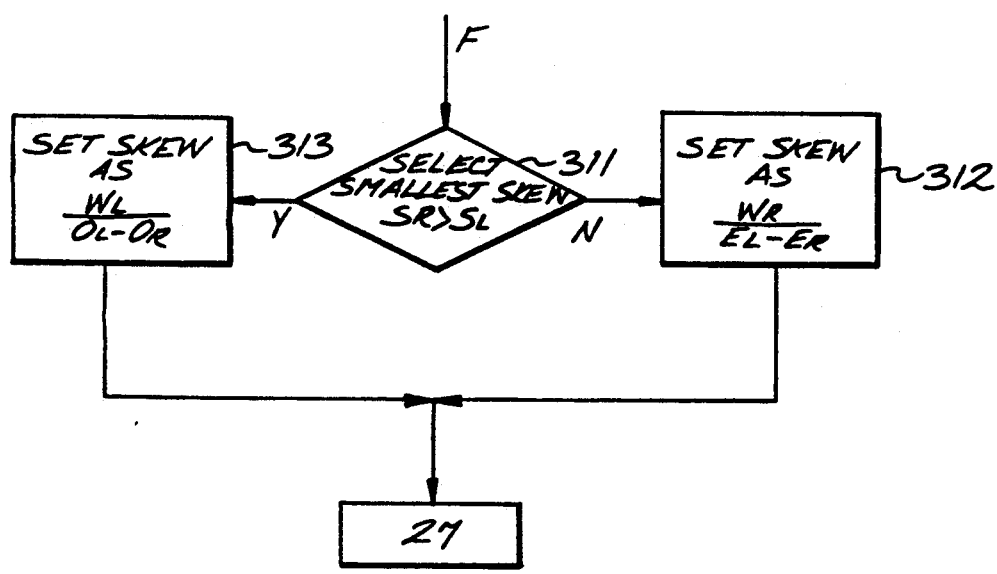

The skew correction process represented by functional block 26 in FIG. 3 is represented in greater detail in FIGS. 9A & 9B. Skew calculation is applied to either the entire document or to a selected section of the document. The program begins by selecting a significant segmented area and setting the relative "X" and "Y" origins the area to zero. The height (H) and the width (W) for the area are calculated 301.

The width to height ratio is calculated 302. The program tests to determine if the H to W ratio is greater than two 303. If it is the skew for this area is set to zero on the assumption that the object is a vertical object 304 and the program exits the skew routine.

If the H to W ratio is less than or equal to two, the scanning parameters of the left half of the area are calculated 305 and the scanning parameters of the right half of the area are calculated as well later in the program 308, dividing the area in two sub-areas. In the special case when the program calculates the skew of an area instead of the whole page, the area will be divided in more than two sub-area to avoid skew induced errors, and the following process is applied to more than two sub-areas.

Vertical histograms are then calculated for the left area 306 and later for the right area 309.

For the left area 307 and for the right area 310, the program calculates the beginning of the histogram as the first location where the histogram value is greater than a threshold ratio to the maximum value of the histogram set by the rules of the execution knowledge base 15. The end of the histogram is defined as the last histogram location where the histogram value is greater than the value.

Figure 9C:
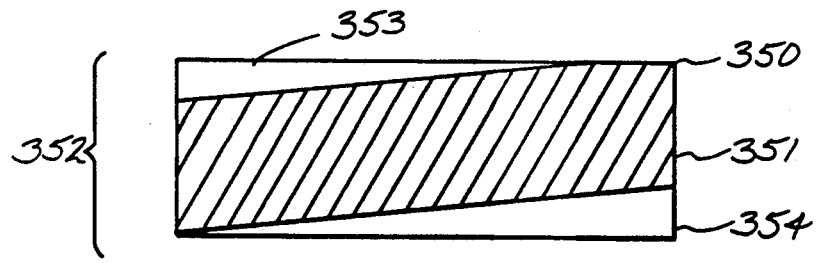
FIGS. 9C, 9D, 9E & 9F are depictions of segmented areas having skew which may be corrected by the operation of the skew correction program, functional block 26 in FIG. 3.
Figure 9D:
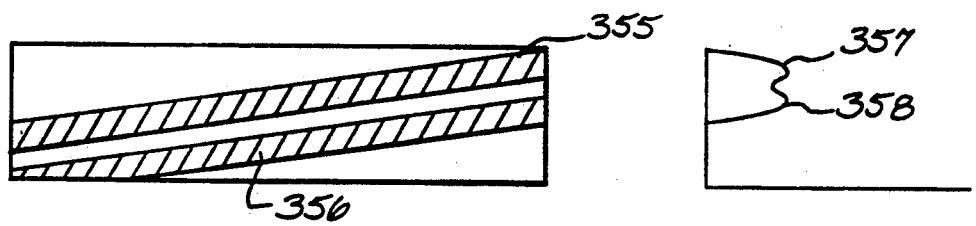

The program next calculates and selects a skew factor to be applied to the left and right of area and tests 311 if the skew of the right is greater than the left. If it is the skew of the area is set according to a first calculation 313, described below, otherwise the skew is set according to a second calculation 312, also discussed below. The skew factor allows the program to correct several problems associated with skew. For example, referring to FIG. 9C, a segmented area 350 has been calculated by the program from a skewed object 351. The skew creates an error in the height of the area 352 and an error in density due to added space 353 and 354. Referring to FIG. 9D, another type of skew problem occurs when two lines 355 & 356 in an area are close together. It can be seen that even when only a modest degree of skew has occurred, the lines are confused during the histogram generation steps and cannot be separated. The vertical histogram 357 contains a segmentation error because a sufficient valley 358 has not occurred to permit the two lines to be separated.

Figure 9E:
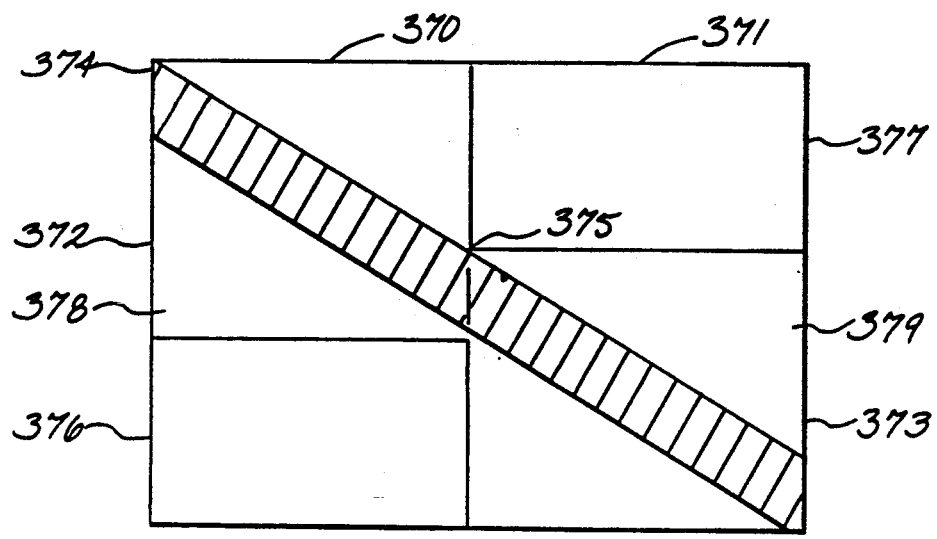

The skew factor is determined by calculating the cotangent of the angle between the scan line and a page or object horizontal line. Skew is expressed as a + or − value. The skew correction steps discussed above and which are represented in functional blocks 305-313 in FIG. 9A will now be applied to an example for clarification of the processes involved. Referring to FIG. 9E, a segmented area is divided vertically into two sub-areas 378 & 379. The program then builds two histograms; one for the left sub-area 378 and one for the right sub-area 379. The skew value for the full area is:

$$Skew = Minimum\ of\ W_1/O_r - O_1\ and\ W_r/E_r - E_1$$

where
$W_1$ is the width of the left sub-area 370;
$W_r$ is the width of the right sub-area 371;
$H_1$ is the height of the left sub-area 372;
$H_r$ is the height of the right sub-area 373;
$O_1$ is the origin of the left sub-area 374;
$O_r$ is the origin of the right sub-area 375;
$E_1$ is the skew error of the left sub-area 376;
$E_r$ is the skew error of the right sub-area 377;
l is the left sub-area 378; and
r is the right sub-area 379.

Referring again to FIG. 9A, the program selects the smaller absolute value for the skew correction $$If\ S_r > S_1\ then\ Skew = W_1/O_r - O_1\ in\ 313$$

$$if\ S_1 > S_r\ then\ Skew = W_r/E_r - E_1\ in\ 312$$

Returning now to FIG. 2, after the program calculates the above parameters, adjusting for skew 26, additional parameters, as shown in Appendix B, are calculated and all the calculated parameters are added to the segmented area list 27.

If a line has been completely segmented 28, the next scanline is selected 22. If it has not, the program retracts to the top right of the area segmented 29 and then selects the same line to re-process 22.

When the end of the last scanline of the page is detected 30, the last area is closed if there is a currently open one 31.

A test is then performed 39 to determine if the calculated skew for the area or the page exceeds a threshold value set by the rules of the execution knowledge base 15. If is does the programs branches back to its initialization point 16 and reprocess the area or page with the calculated skew correction. The page skew is calculated as the inverse mean of all calculated skews for the area weighted by its length. Skew considered as acceptable in the presently preferred embodiment of the invention if the calculated skew is greater than the width of the document divided by 3

All segmented areas are then processed 32 to determine their graphic type by performing the well known technique of linear thresholding pattern recognition using the structural characteristics of the segmented areas and content of the "graphic type" knowledge base 33. For additional information regarding this pattern recognition technique see The Handbook of Artificial Intelligence, Volume III, Ibid.

The program uses the vertical and horizontal histograms and the size of the area to determine its textural characteristics. The textural characteristics are extracted by calculating the appropriate ratio of sections of the two histograms of the area normalized by the total density. The total density for the segmented area is calculated by totalling the horizontal or the vertical histogram and dividing that number by the number of pixels in the area.

The segments are reconstructed in longer horizontal lines 34 by associating areas of horizontally compatible position, for which the X and Y positions fall within an acceptable range indicating words belonging to the same line.

Thin lines close to one another are regrouped 35 as one single line to associate an underline with the text line.

Largely overlapping lines are regrouped 36 when the overlap exceeds 30% of their areas. The program then eliminates all segments 37 for which no type label could be assigned and which are considered not sufficiently large to be significant.

The resulting segmentation information is written to the segmentation file 7.

Figure 2E:
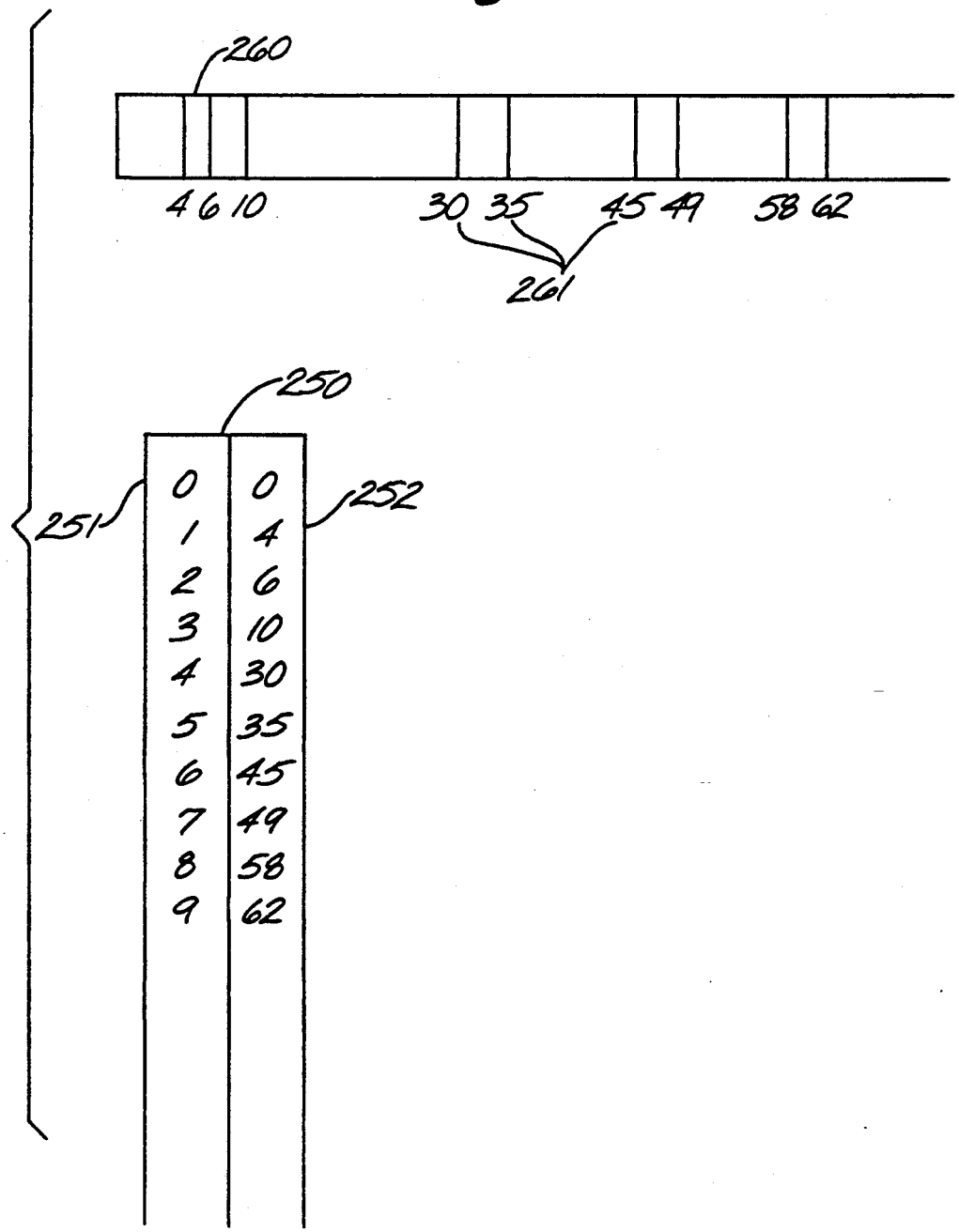
FIG. 2E are two tables of exemplary data, of the type created by the operation of the segmentation program represented in FIG. 2, representing compressed and decompressed file addresses of objects in documents.

In addition to the parameters, pointers to specific areas in the image data storage file 3 are written to the segmentation file 7 by the segmentation program 6. If the program uses the option the access images in compressed mode, the address in the compressed image file 5 is extracted from a compressed scanline pointer table. This table is built at the time of compression or decompression of the image. Referring to FIG. 2E, a compressed 1 dimensional image file 260 is shown. The compressed file addresses 261 of segmented areas in the image are labeled as 4, 6 ... 62. A table 250 is built containing the address of each decompressed line 251 and its corresponding address in the compressed image 252.

The compressed file address consists of a pointer to the byte that begins the line in 1 dimensional compression and the pointer to the byte beginning the segmented area and its displacement in a two dimensional compression algorithm. Any of the two dimensional image compression algorithms well known in the art may be used. The pointer address is associated with the segmented line such that if a segment address starts in line 4 of the uncompressed image and extends for 4 lines, the address stored in the segmentation file will be in the format "30,58,20,60,20,80" where 30,58 are the compressed image file start and end positions and 20,60,20,80 are the absolute or decompressed segment position and dimension in 1/10 mm.

In the presently preferred embodiment, three layers have been implemented. Therefore only line information is stored in the segmentation file 7. In other, more extended embodiments, letter, word and line segmentation may also written in the segmentation file 7.

After completion of the segmentation program control is passed to the matching labeling program 9. In other embodiments of the invention, several documents may be segmented and stored in the segmentation parameters file 7, before processing the documents in the matching and labeling program 9.

C. The Matching and Labeling Program

The areas of the page segmented by the segmentation program 6, as described above, are next matched for class and sub-classes to objects described in the document knowledge base 8 under the control of the execution knowledge base 15.

The document knowledge base 8 is built by the learning and correction program 12 in a layered structure. For example, the document layer contains blocks and the block layer contains lines. The objects in each layer are defined by their characteristics. A search algorithm in the document knowledge base, as explained below, is used to optimize searches permitting the most probable documents to be the first searched.

As described more fully in Appendix D, each layer in the document knowledge base consists of a collection of objects and each object has a label, a class, a probability of existence, structural characteristics, position characteristics and content characteristics, the deviation of these characteristics and the degree of evidence or disevidence of these characteristics.

The class or subclass is defined for each object at each layer of the document knowledge base as the class the object belongs to and the possible subclasses for that object.

The class/subclass structure can be built to as many levels as necessary to fully describe the document.

For example, when a document is labelled as "INCOMING MAIL," its classes can be "LETTER" or "MEMO". Furthermore, each class is classified by origin from a specific company, then by subject, then by originator. Each document additionally inherits the characteristics of the class/subclass structure it belongs to.

Objects in the document knowledge base can also be defined as generic or specific. The term generic object is used for an object described in the document knowledge base as a general purpose object (not specific) for that level, for instance a letter is a generic document and an address is a generic block of information. Specific objects, however are objects which correspond to a specific sub-class within a given class. The subclass "Letter from company XYZ" is a specific subclass of "LETTER," and the XYZ logo is a specific object.

The structural characteristics for each object in the document knowledge base is identical to those previously described for the segmented areas in the segmentation program and consist of height, width, type, number of sub-objects and textural features. Each object is assigned a probability of existence within a layer of the document knowledge base to reflect ratios of the occurrence of the particular object with the occurrence all other objects of the same class. Probability of existence of an object (page or block) is used by the matching and labeling program to determine which objects will be given priority in the matching process.

A relational characteristic exists for each segmented area on the document and is defined as the positional relationship between the area and another area at the same layer and the distance between them. The presence or absence of this relation enhances the evidence or disevidence for the area as being the same as an object in the document knowledge base.

The evidence or disevidence of each characteristic for an area on the document being the same as an object in the document knowledge base is a weight given to this characteristic that will determine the impact that the presence or absence of this characteristic has in identifying the area at that layer.

For example, if a letter is identified by the fact it has a letter head in the top section of the page, this information is stored in the document knowledge base as a letterhead object. When such a header is found in a segmented area at the appropriate location in a document, the finding increases the evidence that the document under consideration is a letter.

Each object in the document knowledge base additionally has structural and relational characteristic represented by a mean value of one or two deviations, a weight of evidence to be applied if the characteristic is present, or a weight of evidence to be applied if the characteristic is absent. All weights are given using a scale of −100 to +100.

In order to optimize the search process, the knowledge base is organized in class levels or sub-knowledge bases. Each of the generic and specific classes for a document are represented by a sub-knowledge base containing the objects and object description pertaining to that class. The full search space represents all the possible class and sub-classes that a document could possibly take during the classification process. For example, if a document can take three different identification labels or classes, three different specific document knowledge bases will be created, each corresponding to a different class for the document at a given classification level.

The same expansion is generated at the next class level and so on until all possible classes and sub-classes are expanded and associated with their specific objects in a specific document knowledge base. At a given class level, specific document knowledge bases are grouped in sections of similar probability of existence to insure that the document with the best probability will be searched in priority. The probability of existence of a document is assigned to the document in the learning program in fuzzy terms, then normalized across all possible documents. The highest level of the knowledge base structure is called generic since the objects it contains are generic to all classes for the document. The next levels of knowledge bases are more and more specific depending on the depth of classification level they represent.

The matching and labelling program 11 is composed of two sections, the search for a matching knowledge base and the building of the evidence for a match between an object and an area.

D. Matching Segmented Areas with Objects

The building of evidence of matches between segmented areas and an objects is a recursive process done in layers starting with the lowest and is similar for all layers. At the lowest layer, the program uses the document segmentation area results from the segmentation program 6 stored in the segmentation parameters file 7 and matches them to the lowest layer of the document knowledge base 8 loaded in the LTM 46. Pre-label hypothesis are assigned to each area in the STM based on the matches.

For each subsequent layer the program uses the previous layer's regrouping hypotheses and the weights of evidence between objects and areas as input and generates a new set of evidence and regrouping hypotheses for more complex objects at the next layer. For instance, the lowest layer has line objects which may be part of block objects in the next highest layer. The program thus attempts to match the lowest layer of its LTM 46 with the results of the segmentation program 6, assigns pre-label hypotheses at that layer, processes the next layer using these hypothesis, generating regrouping hypothesis for more complex objects at that next layer, and so on until all layers have been matched. Different techniques for regrouping smaller areas into larger areas at the next layer are applied depending on the matching strategy described in the execution knowledge base 15. For example, areas of different types may be regrouped because of their logical relationship, rather than their common physical characteristics. These logical relationships are defined in the document learning knowledge base and used during document processing to regroup areas in documents into mixed type areas for matching with mixed types objects. Examples of such mixed type objects include special information stamped on a document, usually after its creation, and complex logos.

It should be noted that the segmented areas in the matching process are represented only by their parameters in the STM 44 and no attempt is made to match actual images. During the matching process, evidence is accumulated on all characteristics present or absent for each object and area using fuzzy logic. A table of evidence for the structural, positional and relational characteristics is built to match objects to areas.

In the structural, positional and relational evidence calculations, a focus of attention technique working from the top down is used to limit the combinational explosion that would result from the matching of all objects with all areas at all layers. Only the objects with sufficient structural evidence and probability of existence at both the upper level and processing level are processed. The structural characteristic of an area gives the program a selection of object hypotheses of what the area could be. These object hypotheses are processed first and if no match can be found or negative evidence exists, the program will select other paths in which objects have a lower probability of existence.

The focus of attention technique is further modified by the use of strategy parameters from the execution knowledge base 15. The execution knowledge base strategy varies the paths that can be selected depending on the specific application and environment by selecting the most appropriate evidence building and object regrouping techniques.

At the beginning of the process, the program concentrates its search on all "good" probable documents with "good" structural evidence. A formula combining the two is used against a minimum threshold that avoids poor choices. The minimum threshold is determined by the policy rules in the execution knowledge base 15. If the process shows a low evidence in a higher probable space, then the search is expanded to a lower initial probability in the search space.

E. The Search for a Knowledge Base and Labeling Techniques

The search space is the list of all possible sub-knowledge bases within the document knowledge base 8 that can be matched to a document. It is organized to optimize the process of finding a match between a document and a knowledge base class. The matching and labelling program 9 searches through all possible document sub-knowledge bases in a top down fashion, attempting to place a document into progressively more specific classes.

When the matching and labelling program 9 is initiated, the sub-knowledge base containing information regarding the most probable documents is loaded in the LTM. If no match can be found, another sub-knowledge base having information regarding less probable documents is loaded and so on until the programs finds a match or fails.

When a match is found at class level, the program will pursue its classification at lower, more specific classification levels until no more sub-classification can be found and the document is identified.

Referring now to FIG. 3, the system enters the matching and labeling program 9 from the segmentation program 6 after area segmentation information has been written to the segmentation parameters file 7 for all layers of the document.

In normal operation, a document knowledge base 8 with the best search space for the application being processed has been previously created by the learning and correction program 12.

The matching and labelling program 9 is called from the selection control program 52. The matching and labeling program 9 attempts to match and label segmented areas in documents to objects from the sub-knowledge bases contained within the document knowledge base 8 through a search sequence built around a first in last out "FILO" stack.

The stack contains the name of all the successive sub-knowledge bases considered for evaluation (or update to the LTM path) and all labels hypothesis for the areas of the document (or the updates to the LTM) generated by the matching process.

In each pass through the program the next subknowledge base to be matched to the segmented areas is located at the top of the FILO stack, and each new hypothesis is entered in the stack.

The program begins by clearing the stack and enters a generic knowledge base, used in conjunction with the sub-knowledge bases, in the stack 49.

A recursive search is then started by retrieving from the top of the stack, the name of the first subknowledge base to evaluate 50.

The program tests if the stack is empty 51. If it is then no match can be performed 53. The program assigns a "fail" label to the image 54 and returns to the menu control program or to the next document to be processed 52.

If the stack is not empty 51, the programs loads 56 the labels for the areas on the document that have already been assigned by the matching and labeling program 9, if any, and selects 57 the next sub-knowledge base to match using the label previously retrieved from the stack 50.

The program tests if no further sub-document knowledge bases can be found 58 using the label name. If it cannot, the program has found a match between a document and class 75 and labels the document with the sub-knowledge base name 76 and returns to the menu control menu or to the next document to process 401.

If a sub-knowledge base is found 58, it is loaded in the program LTM 59 then the program loads the execution strategy 60 to be performed to build the evidence for the document.

The execution strategy for the matching and labelling of an area is composed of a series of operations to be executed in a certain sequence and is described below and in Appendix E.

An execution strategy can be defined for each sub-knowledge base class or subclass or can be defined by default to request all possible actions at all possible layers.

Strategies define the way the program will attempt to build evidence between area and objects. Different documents will be best recognized using one strategy rather than another.

The first strategy step or command is selected 61 and control is given to the strategy loop 63 which performs the building of the evidence for the document, the loop executes successively all actions requested by the strategy 64 until no more actions remain 62, then branches to the evaluation of the results of the matching and the actual labelling of the document and its objects 66.

The program builds a table of all documents with evidence of a match with a class, larger than the policy minimum set by the execution policy 66.

The selected document hypotheses are ranked in increasing order of search desirability 67. The search desirability of a document depends on the existing evidence found for this document and the cost it will take to prove its existence. The cost is represented by the minimum number of documents to be evaluated to achieve the labelling of the document divided by the maximum depth of the search space. The search desirability may be expressed as:

$$\text{Desirability}_n = \text{Evidence}_n \times (1 - \text{cost}_n)$$

Starting from the document with least desirability 68, the objects are labelled 69, and entered in the stack 70, the document is then removed from the table 71, and the next worst document is processed until no document remains in the table 72

Upon encountering an empty pile 72, the program returns then to the beginning of the loop 50 and retrieves the next sub-knowledge base to evaluate. This looping continues until the stack is empty 51 or no subknowledge base with the last label exists 58 resulting in the document or object being labelled with the last label.

1. Strategy Execution and Evidence Build Up

Functional block 63 in FIG. 3 represents the matching and labeling program's 9 execution of one step of the selected matching strategy. FIG. 4 is a flow chart representing the operations represented by block 63.

Executing the strategy step or command, the program selects the search strategy layer 75 and loads the LTM layer on which the action is to be performed. The action routine 76 is selected. The strategy parameters 77 relative to the action are selected and the program gives control to the action routine.

The process of building evidence and making a hypothesis depends on the specific action called by the strategy. The set of operators that will permit the building of evidence for an object or link one area to another at the same layer, or on two different layers, is provided by knowledge sources under control of the execution knowledge base 15. Knowledge sources define special action rules to apply in artificial intelligence programs based on the application and the environment and are referred to here as actions.

The actions required to match areas to objects are divided in 2 groups. In the first group they build up the evidence of existence for LTM objects at the current layer, by calculating the structural 78, positional 79 and relational evidence 80 of an area to be an object. In the second group the actions build new hypothesis for objects in the next layer by creating 81 or discovering 83 relations between objects or grouping objects of the same type in the current layer 82. These actions are described in more detail below.

A complete evidence building strategy for a 3 layers LTM includes the following action sequence :
a. Build object evidence at lowest layer;
b. Hypothesize new object in next layer;
c. Verify second level hypothesis and prelabel;
d. Build object evidence in second layer;
e. Hypothesize new object in the third layer;
f. Verify third level hypothesis and prelabel; and
g. Build object evidence in third level.

A so-called intuitive search strategy that does not follow this sequence and bypasses several actions, could give incorrect results but correct guesses at the lowest layer could hypothesize objects directly into the third layer.

2. Actions for Building Evidence

Figure 5:
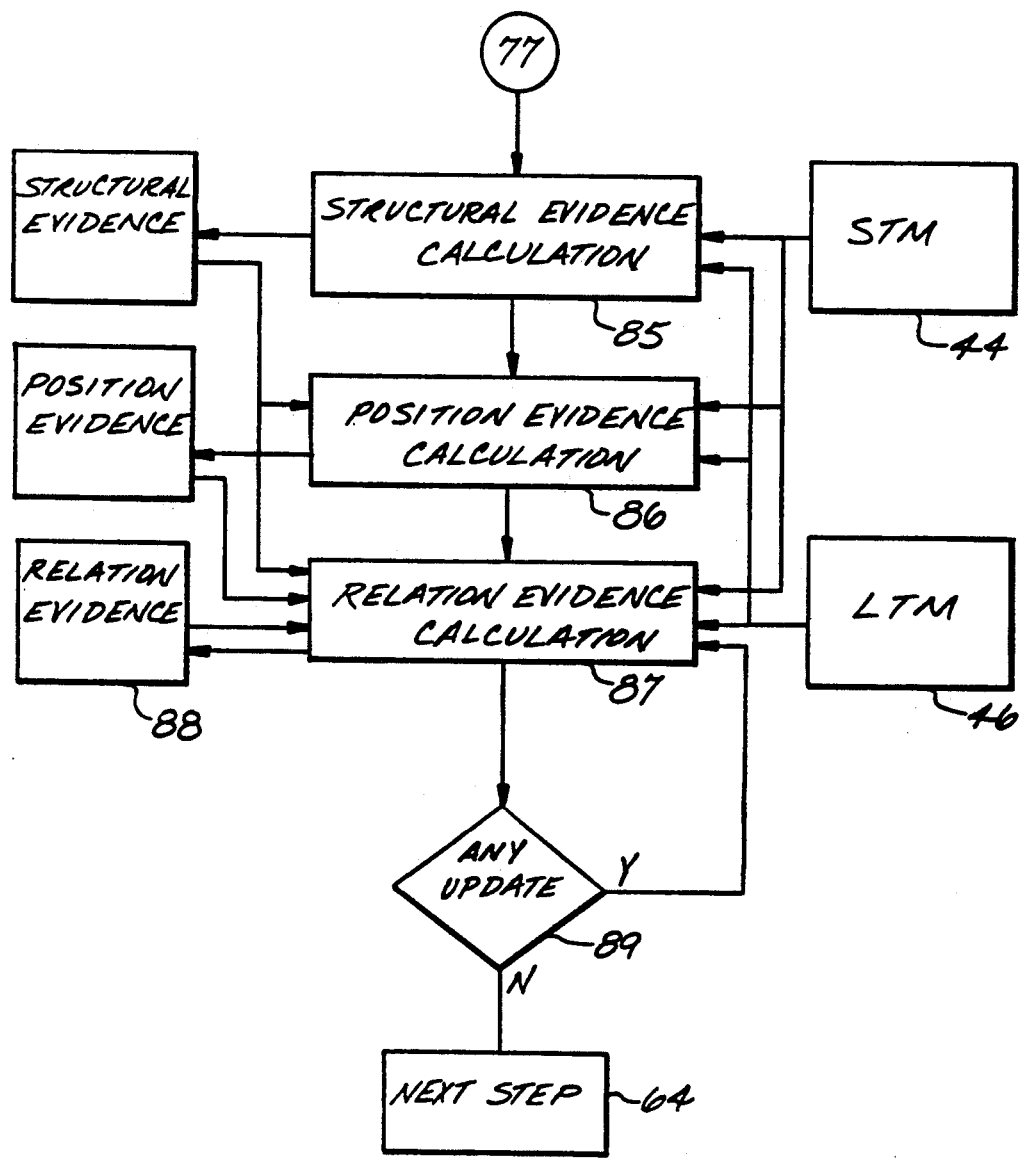

FIG. 5 is a functional block diagram of the program steps represented by blocks 78, 79 and 80 of FIG. 4. The program calculates the evidence of a match between a segmented area and an object using the three types of characteristics: structural, positional, and relational.

The default strategy utilized by the program processes all three characteristics' evidence but any one can be bypassed in an optimize strategy.

For each segmented area in the STM 44, the program calculates the sum of the weight of evidence for all characteristics of the area by matching them against the characteristics of objects in the LTM 46 in the current layer. This is achieved by matching the value of each characteristic of an area in the STM 44, to the value of the same characteristic for a selected object in the LTM 46. If the value of the characteristic of the area falls within the boundaries defined by a mean value, plus or minus an allowed deviation, the weight of evidence for that characteristic is added to the total evidence.

The program calculates the tolerance of deviation as $$T = D_b \times (100 + P)$$

where

T is the tolerance factor;
$D_b$ is the deviation in the LTM; and
P is the fuzziness factor set by Rules from the execution knowledge base and reflecting the level of tolerance on characteristics deviation.

The program calculates the weight of evidence applied for the characteristic Wa as:

$$\text{If } |V_a - M_b| <= D_b \text{ then } W_a = W_b$$

$$\text{If } |V_a - M_b| < T \text{ then } W_a = -W_b$$

$$\text{else } W_a = W_b * (1 - 2*(|V_a - M_b|/(T - D_b)))$$

Where $V_a$ is the value of the characteristic of the area from STM;
$M_b$ is the mean value of characteristic from LTM;
$D_b$ is the deviation of the characteristic from LTM;
$W_a$ is the weight of evidence to apply to the area;
$W_b$ is the weight of evidence in LTM; and
The symbol | represents the absolute value.

The result of the matching for a characteristic is a weight of evidence or disevidence for the object under consideration that this characteristic exists or does not exist as an area.

The structural characteristics are evaluated 85 by height, width, type, number of sub-objects and textural features. These characteristics are compared for area and object and the evidences of the structural characteristics are added to obtain the total structural evidence.

Next the position evidence for an area is calculated 86 if the area has a total structural evidence above the threshold amount set in the execution knowledge base rules. The position evidence is calculated by comparing the position of the object in the next layer higher object it is contained within with the position of the area under consideration.

Finally the relative evidence is calculated in 87 between areas with sufficient structural and position evidence that are identified as relations in the area in which it is located in the next higher layer in the LTM. The sum of the structural, position and relative evidences defines the final evidence table for that level 88.

The various evidences are ADD'ed, OR'ed and AND'ed using fuzzy logic evidence calculation techniques. The selection of the appropriate operator depends on the model in the document knowledge base, the type of characteristics and the type of process involved.

In the presently preferred embodiment of the invention, the structural characteristics evidences are ADD'ed, the position and relational evidence are OR'ed and then normalized, and the verification process AND/OR's the evidences.

The relative evidence calculation 87 is repeated, using global mathematical relaxation techniques, until there are no further changes detected 89 in the table of evidence 88.

Global mathematical relaxation techniques are well known in the art and are used to improve the evidence of objects using the relational rule. It is a very general computational technique that has been used in computer vision programs to assign labels to objects in an efficient manner. For further information see: *Computer Vision Systems*, op. cit., Vol III at 292-300, which is incorporated herein by reference.

3. Actions for Regrouping Segments in an Upper Layer Object

In the current embodiment of the invention the building of regrouping hypotheses for a next layer object relies on three methods: geographical regrouping, preferential path regrouping and maximum evidence origin regrouping.

The execution strategy defines which regrouping actions will be used in the current execution of the program.

Geographical Regrouping or the Geographic Rule:

Once the areas from the segmentation parameters file 7 have been identified and pre-labelled as objects described in the document knowledge base 8, they may be grouped with vertically compatible objects of same graphic type to form an area of larger size which could be a possible match for labeling at a higher layer. This action may not be taken when mixed types of objects, also called complex objects, are to be matched by the program. For example, lines of text of the same graphic type may be regrouped in blocks to identify paragraphs in a letter.

Preferential path regrouping or the Create Rule:

This rule to create a composite object at an upper level works best on a limited predefined number of selections ("n") for each sub-object. The rule operates as follows:

a) Starting with the previously calculated structural evidence for the objects on the areas, the program creates a list with all the area evidences for the first sub-object;

b) The program selects the best n evidences out of the list and their area and creates a new list;

c) If no more sub-object exist the program branches to the hypothesis process below;

d) For each remaining position the program calculates the positional evidence for all other areas having a minimum structural evidence set by the policy file, for the next sub-object and creates a new list;

e) The program returns to step b), above, n-1 times;

f) Hypothesis are processed for all existing list positions; and g) The program hypothesizes an upper object with evidence of existence equal to the content of the list.

Maximum Evidence Origin or The Discover Rule:

The following rule allows an object composed of areas which are of different types and which are not geographically regroupable, to be accommodated and linked to either another area at the same layer, or to an area on a higher layer:

a) Select Object hypothesis;
b) Select minimum thresholds from execution knowledge base;

c) Calculate structural evidence for all area on all objects;

d) Select first sub-object and offset deviation of sub-object in object;

e) Select first area;

f) Total on a vector VxVy the evidence of the selected area being a selected object at an offset distance from the origin of the area;

g) Perform this calculation for all areas;

h) Multiply the vector Vx and Vy by the weight contribution of selected sub-objects to the object;

i) Add both vectors Vx and Vy to total X and Y;

j) Find the maximum value and its location in total X and total Y;

k) Compare the maximum found and the minimum threshold set from the execution knowledge base 1) If a pair exists, use it as origin for the composite object and calculate the probability of existence of the object;

m) If the probability of existence is greater than the operator specified minimum, the program creates a block area as hypothesis for the composite object;

n) Find the next maximum in the vectors; and o) Return to k) until no more pairs are found.

The above rules allow an object composed of areas which are of different types and which are not geographically regroupable to be accommodated and linked to either another area at the same layer, or to an area on a higher layer.

G. The Retrieval and Execution Program

An objective of the current invention is to permit the retrieval of digitized images in a timely and functional manner. The automatic classification system described in the presently preferred embodiment of the current invention generates the essential retrieval keys or labels necessary to identify a document by class and sub-class which is incorporated into the presently preferred embodiment.

The retrieval and execution program 11 allows a system operator to select retrieval criteria for a certain image and the program will search the data base 13 for records corresponding to the search criteria. When a match is found between the request and an image file, the appropriate image record is brought from the image data storage file 3 and displayed on CRT or is printed.

For example, the program allows the retrieval of all documents of a class, all documents of a subclass or a combination of the two. The presently preferred embodiment brings a new capability to retrieval of stored digital images. During the classification process, described above, the various relevant segmented areas of a document are labelled as known objects by the system. This means that these known areas such as an address, a date or an account number can be searched for and retrieved by the system. The matching and labelling program 9 creates a record in the segmentation parameters file 7 containing pointers to each area identified as an object in the document.

A method of retrieval unique to the invention is the retrieval of documents by identified classes and sub-classes such a "retrieval of a letter from company A," where no operator input nor OCR techniques have been used to identify documents as "letters from company A." Additionally, an operator may request the extraction of certain labels such as all areas of documents which have been labelled "date" or "account number." Even though these areas have only been identified by a generic label and that the exact content of the area is still unknown to the system, the system is capable of retrieving all documents containing these labels. Furthermore, the retrieval program allows the user to specify combination of labels to be present in the document to further define the search criteria such as label A and label B.

Another retrieval method available in the presently preferred embodiment of the invention is the ability to retrieve documents based on features contained within the documents. The segmentation 6 and matching and labelling 9 programs create, for each segmented area labeled as an object in the document, a descriptive record containing all the characteristics of the area. A description of these characteristics, referred to above as features, may be used as the basis of a search. One way of specifying features is to define areas containing a minimum density of black pixels in a certain location of the document. This area could thus correspond to a mark or a selection box on a form which can be empty or filled-in. The retrieval program thus allows the search of documents on the bases of criteria such as: "find all documents of a certain class where a certain zone has been filled in (such as answers to a questionnaire)." Such a search may be made even if these areas have not been identified as significant objects in the document knowledge base 8.

The retrieval and execution program 11 is used to define a search for desired documents based on characteristics such as the presence or absence of a labeled area or the physical characteristics of a labeled area on the page. The program will then retrieve all documents and objects matching the search parameters.

In the presently preferred embodiment of the invention this method of retrieval can be also used dynamically. When an image file has been processed for class and sub-class only and no areas have been labelled as objects by the program in order to save processing time, the matching and labelling program 9 can be activated dynamically from the retrieval and execution program 11.

When the operator requests the matching of a selected object with un-labeled areas within a class of documents or within un-classed but segmented documents, the matching and labeling program 9 will attempt to match the selected object with the segmented parameters file 7 and select all documents meeting the characteristics of the object defined. Using a composite object description, the retrieval and execution program 11 can search for any area labeled as an object in the data base 13, providing its characteristics can be described uniquely to the matching and labelling program 9.

An example of such a search would be to search in a segmentation parameters file 7, whether labelled or not, for all documents with a stamp, a particular filled-in area, a title or a given company logo.

The ability to retrieve and extract specific objects from a page, results in a benefit unique to the current invention. Because it is not necessary to display the entire image of a document on a CRT to find the information searched for and since the invention permits the retrieval of areas of the document corresponding to identified areas only, it is practical to use significantly lower resolution CRT screens and to transfer significantly less data from the image file than is required with other document retrieval systems.

Current document retrieval systems normally use CRT's with a screen resolution of a minimum of 1000×1200 pixels. Using the object selection feature of the retrieval and execution program 11, CRT's with resolutions as low as 640×400 can be used.

In order to compensate for the various possible sizes of objects selected and the necessity to fit them in a fixed display area, the system automatically applies a zoom algorithm before displaying selected areas on the screen.

Since the labelled segmentation parameter file 10 contains the exact location of the area in the compressed image file, the retrieval program has the ability, as described above, to extract the area from the compressed record without decompressing the entire page thus significantly reducing retrieval time and system communication load.

Display rules are coded in the execution knowledge base 15 for each document class and sub-class. When the retrieval and execution program 11 finds a match between an object designated by the operator and a labelled document stored in the data base 13, a further search is made in the execution knowledge base 15 for a description of the object. The instructions needed to present the selected object on the CRT or printer are read and used by the retrieval and execution program to display or print the selected information only.

The execution knowledge base 15 is created for each document class and sub-class to control the execution and retrieval program 11. The execution knowledge base 15 contains rules which are applied to documents and areas labelled by the matching and labelling program. Upon retrieval of preselected objects in a specific class of documents, the rule pertaining to that class is applied and only the areas representing the selected objects will be displayed by the display program.

The execution knowledge base 15 is also used to control the flow of documents though the system. All classes and sub-classes of documents and their objects are described. Each has its individual action code that defines what to do if present and what to do if absent from the data base 13.

The execution knowledge base 15 additionally allows defined actions on documents or objects to be carried out without operator intervention. For example, in an exemplary embodiment of the invention, certain documents are described as containing several required objects. After processing by the matching and labelling program 9, if one of the objects is missing, the execution knowledge base 15 will forward an action code to retrieval and correction program 12, which results in the provision of warning to the operator of the missing object.

In another exemplary embodiment, the retrieval and execution program 11 is used to create tables of contents and abstracts of documents. By defining the characteristics of titles and areas of importance of certain documents and placing this information in the execution knowledge base 15, the matching and labeling program 9 will create a table of all objects in documents meeting these criteria. The retrieval and execution program 11 will then, for each class of preselected document, present on the CRT or print a list of all titles or relevant areas, thereby creating a table of contents. Direct access to the specific page on which the object is located is also provided.

In still another representative embodiment, the retrieval and execution program 11 has the ability to retrieve a document and selectively mask (or enhance or change the color) certain confidential (or important) information contained in preselected labeled areas of the document. A confidential code is assigned to selected objects in the execution knowledge base 15. The same masking technique is applied to background information on forms. By defining the pre-printed background information on a form document as one or several composite objects, and entering this information into the execution knowledge base 15, the system is directed to store the form's background only once and to store only the variable information in the data base 13, which corresponds to the filled-in information of the forms. This allows a significant reduction of the space required in the data base 13 needed to store data on the forms. At retrieval time, the form is reconstructed using the background information from the execution knowledge base 15 and the variable information from the data base 13.

FIG. 6 is a flowchart showing details of the operation of the retrieval and execution program discussed above. Retrieval parameters, selected by a system operator or provided by the execution knowledge base 15, are loaded into the program 100. The parameters may include class, sub-class, object label or object characteristics. The action code describing what the program must do with the objects found is contained in the execution knowledge base 15. A representative simple action code is: print the objects matched to the input parameters together with a descriptive label. More complex action code is: upon presence or absence of a specified object, print a letter using specific objects of a document, combined with a prerecorded letter text. In an exemplary embodiment of the invention the completed letter would remind a customer that he did not supply the information requested in a specific block of a form questionnaire.

The program tests if there is a match between the requested class or subclass 101, or requested object label 102, and any of the records in the data base 13. The program extracts from the data base, the exact location of the image record and the corresponding labelled segmentation record for class or sub-class matches 103 and object matches 104. If a match is requested on an object's structural or relational characteristics, the program searches the labelled segmentation parameter file 10 for objects with characteristics matching those requested 106.

The program then tests 107 to determine if there is a match between a document and a request for an object which has not been labelled by the matching and labelling program 9. If this condition is found the matching and labeling program 9 will be called interactively to process the matched document for the requested objects before continuing in the retrieval and execution program.

The image record or image records' segment is then fetched from the image file 109. The action code from the execution knowledge base 15 for that class or sub-class or object is tested and the corresponding process is called 110. If the requested process is printing, the program test if the print or display request is for complete or partial image 111. If a complete page is requested the complete image is printed or displayed 112. If a partial page is requested the selected segments according to the rules in the execution knowledge base 15 are printed or displayed 113. If the action code is different from printing, the relevant special process is activated in 116.

In another embodiment of the invention the execution knowledge base 15 is coded to call for a special process to be performed on the labelled areas. For each area matched to an object the execution knowledge base 15 requests the program branch to an OCR identification program as described in Appendix C.

In another embodiment of the invention the execution knowledge base 15 requests the program branch to a bar-code or mark-sensing program at this point, also described in Appendix C.

The program then tests if all requested documents have been processed 114. If they have the retrieval program is terminated and control returned to the menu control program 52. If more documents are to be processed another image is fetched from the image file 109.

H. The Learning and Correction Program

In order for the system to identify documents by characteristics matching, a document knowledge base 8 must be built identifying the classes, sub-classes and object descriptions for the documents to be identified.

In the document knowledge base 8, the documents definitions have been divided into several layers and classes and sub-classes within a layer. In the presently preferred embodiment of the invention there a minimum of three layers respectively for pages, blocks and lines.

For a specific layer, classification is achieved by assigning classes such as letter, invoice, loan and sub-classes such as "from company A, from company B," and then as many further sub-classes as needed to precisely classify the document.

In order to classify a given document, the system must know the characteristics of that class, and be able to recognize all the possible sub-classes such as which company has sent a letter or invoice, or what specific form is being processed from a loan or mortgage application.

Two methods of creating and updating the document knowledge base are available within the presently preferred embodiment of the invention: manual and automatic. A description of both methods follows below.

1. Knowledge Base Creation and Updating By An Operator.

The learning and correction program 12 is used to permit the system operator to create and modify the document knowledge base 8. Each segmented area and its composing lines are presented to the operator who instructs the system if it is relevant or not to page identification. If it is the system creates an object representing the area and operator gives a name to the object. All identification parameters for the object such as standard deviation, physical characteristics and evidence are automatically calculated and assigned from the area characteristics and stored for the new object in the document knowledge base.

The system then builds an evidence for: 1) The absolute position of the object on the page; 2) The relative position between the object and other significant objects on the page; and, 3) The sub-objects contained in the object, if any.

Using this information, the learning and correction program will construct the necessary information and place it in the document knowledge base 8 to permit the matching process to operate.

The learning and correction program performs the same functions as that of the matching and labelling program 9 except that an operator decides what areas and characteristics are significant.

Figure 7B:
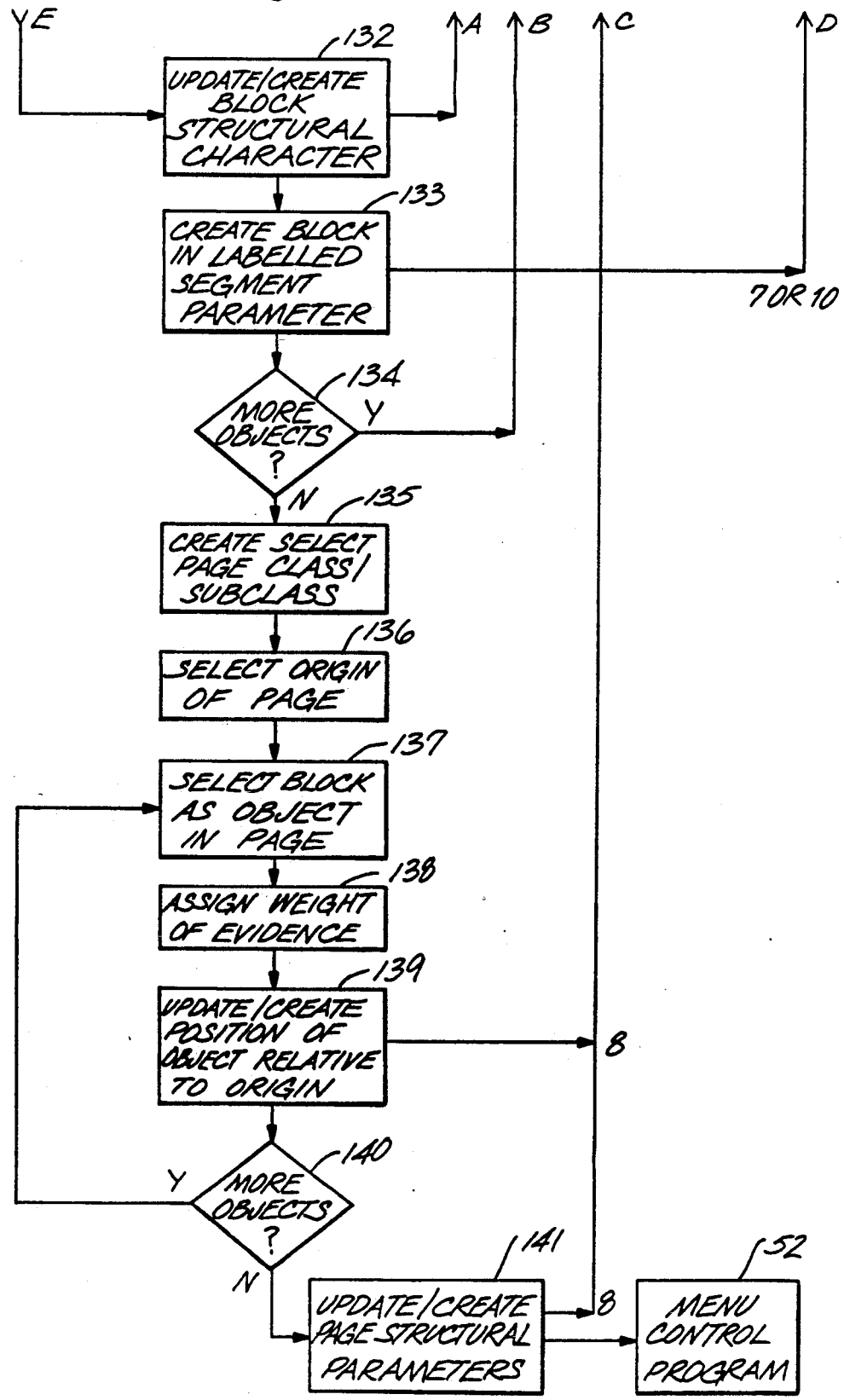

FIGS. 7A & 7B are a functional block diagram showing details of the operation of the learning and correction program discussed above. The creation or update of the document knowledge base is done for the three layers it contains starting with the lowest layer and moving upwards or vice versa.

Entry into this program is from the menu control program 52. An image of a document to classify is initially selected 121. The document is representative of the classes and sub-classes to be created. The document has been previously segmented by the segmentation program 6 and stored as a non-labelled document in the segmentation parameters file 7 or if the document is to be updated it has been stored in the labeled segmentation parameter file.

The segmentation parameters for the selected document are loaded in the program memory 122. Each segmented area is displayed on the system CRT and the operator selects those which are significant and representative for classification purposes 123.

Any area can be selected providing it is reasonably unique to the document class or will become reasonably unique when associated with other segments in the case of composite objects. Upon selection of a segmented area, the program will match all existing objects in the document knowledge base 8 to determine if their characteristics are similar to that of the selected segment. Lines, objects or pages with structural characteristics similar to that of the area selected are displayed with their label on the CRT to avoid creating objects duplicating those already described in the document knowledge base 8. If the segmented area is acceptable to the operator, it is labelled by the operator and the knowledge base is updated with that object and all its characteristics 124. The program also assigns a sequential number to each object unless directed not to by the operator.

When it is determined that all significant areas in the lowest layer have been labelled 125 the program begins operation on the next layer 126. The next layer defines and labels blocks. A block is composed of one or more lines. The operator selects 127 the class label for the first significant block on the page. The operator selects the segmented area which will be the origin point of the block, and all the labelled areas (lines) which will be part of the block 128.

The operator enters a value 129 that he believes represents the weight of evidence brought by the presence or absence of this line for the identification of the selected block in the matching and labelling program 9. The block object is created or updated in the knowledge base 130 with the line object label and the new position of the line object relative to the origin point of the selected block. When it is determined that all line objects have been selected 131, the block object structural characteristics are calculated in the same way as the structural evidence was calculated in the matching and labeling program, block 85 of FIG. 5. The results of this calculation is saved 132 in the document knowledge base 8 as the structure for the block.

The program creates a block area 133 in the labelled segmentation file 10, composed of the selected segmented areas.

When no more significant objects need to be created or updated, the program branches 134 to assign class and subclass to the page. The same procedure is followed for the page classification as for the block identification. The operator selects the page class and sub-class labels 135, selects the area of origin for the classification process 136, selects the labelled blocks which will be used to identify the page 137 and assigns the weight of evidence for the blocks in recognizing the page 138.

The program creates or updates, the block object position characteristics in the page relative to a selected origin 139. If all blocks have been selected and positioned in the page 140, the program updates the structural characteristics of the page 141, otherwise the next block in the page is selected 137.

The procedure used to select an area for labelling at the line, block or page level, functional blocks 123, 128, 137 of the flow chart shown in FIGS. 7A & 7B, is now described in greater detail. Each area on a page must be equated to an object at each layer of the document knowledge base 8. To place these relationships in the program, the operator points at an area of the image displayed on the CRT and assigns a label for the corresponding object in the document knowledge base 8. Referring now to FIG. 8, the operator selects the layer of the document knowledge base 8 that must be created such as line, block or page 151. The program will access the segmentation parameters file 7 at the selected layer. A pointer is set to 0 to refer to the first area at that layer 152.

The first area in the segmentation parameters file 7 is displayed (a line, block or page depending of the accessed layer) 153.

A menu requesting an input is presented to the operator for selection the next function 154. Choices presented to the operator are: selection of the segment for labelling, get next or previous segment, get first of last segment, jump to the +nth or −nth segment in the segmentation file or return to the selection menu. If the operator's choice is to fetch another segment according to one of the above choices, the program will fetch that segment 155 and display it 153. If the operator' choice is to select that segment for labeling, the program will ask the operator to propose a label for the segment 156 and exit the area selection routine 157 with the segment number and label held in memory for the next operation within functional blocks 123, 128, 137 of the flow chart shown in FIGS. 7A & 7B.

This completes the description of the manual method of creating and updating the document knowledge base. The automatic method of accomplishing this function follows below.

2. Automatic Document Knowledge Base Creation and Updating.

a. Automatic Sub-Class Creation.

To eliminate human intervention in assigning sub-classes, the invention provides a learning system for automatic creation of sub-classes within a class, as explained below. By identifying specific and significant areas in a generic document the system will make an assessment of the relative importance of certain zones in the document. Given the identification of a generic class such as a letter and a generic object as a header, the probability for this header to be relevant in the identification process of a sub-class is high. The same applies for other areas in the document. For example, the body of a letter has little impact in the determination of the sub-class (origin) of a letter, but relevant areas with specific graphic types may be significant. The system generates a sub-class using objects labelled "header" in the identification process as well as other objects corresponding to graphic types in a relevant areas (such as at the top of the page).

Using absolute and relative position and the probability of an area to be of a certain type, the system will use these evidences in automatically assigning a sub-class.

b. Automatic Reinforcement of the Sub-Class.

When a document is recognized as belonging to a class but no match can be found for sub-class, a new sub-class will be created by using the relevant objects of the class. When a subsequent document is identified as the same class and sub-class, the object and rule for the sub-class are updated and reinforced or weakened as evidence contributing to sub-class identification. The sub-class matching and sorting can then be achieved entirely automatically and dynamically as the system improves itself through pattern matching as documents are processed.

c. Automatic Sub-Class Sorting.

When a document has been classified in a certain class, the system selects the relevant objects for this class and an unclassified area of the document with a specific graphic label. The objects are inserted in the object structure of the document knowledge base. The type of the graphic is inserted into the graphics knowledge base. Finally, the absolute and relative positions of the objects and the area in which the graphic is located are introduced, as a content rule of the sub-class using small deviation and large evidences, into the document knowledge base.

When another document is processed and identified in the same class and sub-class, the sub-class parameters are automatically adjusted to improve matching on subsequent documents. The sub-class definition evolves towards an averaging of the matches found for all the documents identified. When a non- significant area has been selected in the first sub-class creation, it will be phased out if it does not exist in subsequent documents of the same sub-class.

Adjustments are made using characteristic average and deviation to match the whole range of parameters.

If the range is large, the evidence contribution will be lowered, if the deviation is reduced, the evidence will be increased. Sub-classes cannot be labelled by this method except by the use of a sequential sub-class number. However, all documents belonging to such an identified sub-class will be grouped together under the same sub-class number and can be retrieved and labelled in a single operation.

d. Automatic Generic Class Creation.

In order to create a generic class, several documents belonging to the class are needed. The operator is initially requested to identify the class of the document. Each segmented area in the document is then viewed and defined as relevant or irrelevant to the classification. When an area is declared relevant and is labelled by the operator, an object corresponding the area is created in the document knowledge base 8. When all segmented areas have been viewed, the relations between all relevant areas are calculated. Several documents are used to update the object structure and page content in the definition of a class.

The source code of the presently preferred embodiment of the invention is set forth in full in Appendices K, L and L. The letter "L" was used to label the last two appendices and there are no Appendices H, I or J.

The source code and foregoing discussion discloses and describes two embodiments of the present invention. One skilled in the art will readily recognize from such discussion that various changes, modifications and variations may made therein without departing from the spirit and scope of the invention as defined in the following claims.

APPENDICES

APPENDIX A - Glossary of Terms blackboard architecture:
A way of representing and controlling knowledge based on using independent groups of rules called knowledge sources that communicate through a central data base called a blackboard.

class:
Identification label of an object or document achieved by successfully reaching a satisfactory level of evidence of an object or a document to be of that specific class.

formatted document:
Document where the information is expected to be present in the same location for every document of the same class as in the case of forms.

fuzzy logic:
An approach to approximate reasoning in which truth values and quantities are defined as possibility distributions that carry linguistic labels such as true, very true, not true, etc., or approximation numeric values representing imprecise evidences of existence of certain facts.

histogram:
A representation of a frequency distribution, here used to represent pixels distribution over certain areas of the document.

hypothesis:
Selection of a possible solution to the problem to be verified by additional facts.

knowledge base:
A computer file containing the rules defining knowledge about a problem represented in a structured fashion.

knowledge base system:
A program in which the knowledge about a problem is explicit and separate from the program itself.

knowledge representation:
The process of structuring knowledge about a problem in a way that make the problem easier to solve.

label:
Name assigned to an area after successful match between an area in the STM and an object in the LTM.

long term memory or LTM:
Full knowledge of the structure and contents of the documents to be processed stored in the knowledge base.

matching:
Process of comparing short term memory information for a document to the information in the long term memory and the attempt to match as many like parameters of each as possible through a controlled search.

object:
Representation of the knowledge about an area of a document with specific identifiable characteristics stored in the LTM.

rule:
A formal way of specifying a recommendation, directive or strategy usually represented in the IF THEN form.

scanning:
The process used to digitize documents using a CCD scanner or similar technique. The document is moved in front of a CCD area or the CCD is moved in front of the page, or a set of mirrors are moved in order to scan a page. The analog reflective values of light received are converted to a multi-digital grey scale number by an analog to digital converter. The multi-digit grey scale number is then reduced to a black or white 0 or 1 binary number by comparison to a threshold value. Each pixel stored in the system thus represents a light or dark point within the original document.

segmentation:
Process applied to the document in order to isolate areas of significance having common characteristics.

short term memory or STM:
Information gathered on the document or area currently under examination and which resulted from the segmentation and labeling of the areas of the document.

unformatted document:
Document where the same information may be located at variable locations on the document but in a logical fashion with regards to other pieces of information on the document.

APPENDIX B—Additional Skew Processing

Correction for Area Parameters

After the skew correction factor been calculated, other parameters of the area are corrected using the measured Height ($H_m$) and Width ($W_m$):

$$H_{corr} = H_m - Abs(W_w/Skew)$$

where
Abs = Absolute function
$H_{corr}$ = Corrected value
Density is also corrected by the factor of:
$D_{corr}$ is thus the Blackcount divided by the Corrected Surface or
$D_{corr}$ = Blackcount/($H_{corr}$ × Wm)
Since $W_m$ is typically small compared to $H_c$orr, and since normally scanned images are vertically oriented, most areas are thin and vertical skew does not affect their width.

Skew Correction in an Area or Page

The segmentation error caused by skew is corrected by building the histogram of the Y axis with the skew correction.

Figure 9F:
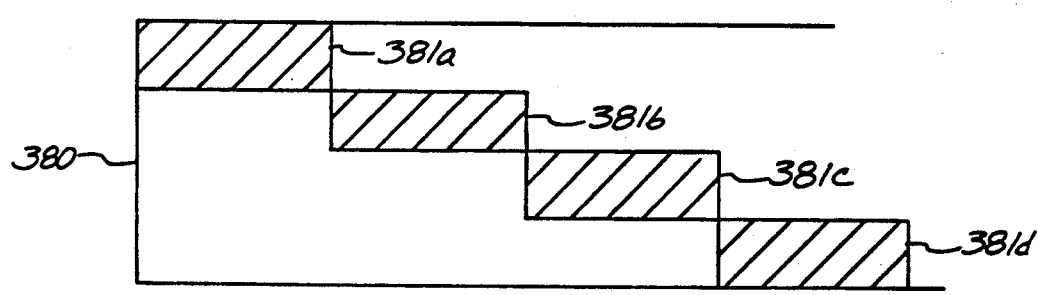

This is done by cutting an image line in several segments of a length equal to the value of skew. Each segment is shifted up or down by 1 line and rebuilding the line. Referring to FIG. 9F, a segment of 4 scanlines 380 with a skew of ¼ has been divided into segments of ¼ of its length 381a–381d. Using several passes through the program, each segment is shifted up or down in increments of one line to rebuild the line into a straight line.

To find the correct segmentation, the histogram Width/Skew must be added further than the segmentation decision area The page skew is calculated by:
1) Summing the products of the area width by its skew for all areas having positive skew and for all areas having negative skew;
2) Calculating the weight of each sum as equal to the sum of the length of the areas of skew having the same sign;

3) Selecting the sum with the largest weight:

$W_p$ = Summation for i=0 to i=n of the width of the area

4) The skew of the page is therefore:

$S_p$ = Summation for i=0 to i=n of the width of area X skew of area divided by the Summation for i=0 to i=n of the width of area for area with skew of the same sign

APPENDIX C—OCR Interface and Syntax Dependent Processing

Using another embodiment of the invention to identify and extract selected fixed and variable locations within a document, the system may be used as a pre and post processor for Mark-sensing, Optical Character Reader (OCR) or Bar-Coded Reader systems.

In the case of OCR systems, the matching and labelling program 9 can identify a preselected print font used in a class of documents. In the graphic knowledge base 14, printed characters are described in as many sub-classes as there are potential fonts, each font having certain distinguishing graphic characteristics. When the program finds a match and a given font sub-class, this information is passed on to the OCR system.

The invention both assists and corrects the OCR system's results. When an area has been labelled as an object, for example a date or an invoice number, the invention does not know the exact alphanumeric content of that area. To obtain this number, optical character reading must be performed using one of the many existing methods well known in the art. Once an area has been logically identified and a rule in the execution knowledge base 15 has determined that OCR must be attempted, the bit map image of the area is sent to the OCR system. After the OCR function is completed and the characters are sent to the invention a context verification will be performed by the invention using its learning and correction program 12 to update its knowledge of the characteristics of the area. This function permits the invention to guess some of the characters in like labeled areas without requiring that knowledge to be included in the OCR process. This function is called syntax dependent OCR. Because of its knowledge of the context, the invention is capable of guessing some words with only a few letters being recognized by the OCR process. For example, after building rules in the knowledge bases regarding dates, if an OCR system returned for an area labelled "date" the following data stream: J*L* 20 Ih 2*88, where * are unrecognized characters, the system could replace this without risk of error by Jul. 20, 1988.

APPENDIX D—The Three Layer Knowledge Base of the Presently Preferred Embodiment of the Invention 1. The Document Knowledge Base Format.

A document Knowledge base is created for each application. It is possible to maintain a single knowledge base for all possible documents processed but this slows down the labelling process since the system will have to consider many different possibilities prior to selecting a document. It is more appropriate to create a knowledge base for the document classes and subclasses that will be part of a given process batch. The document knowledge base may be stored in a file referred to as:

\VS \object \ project \project.dat where:

VS = the main directory;
object = the directory containing all knowledge bases;
project = the application name; and
project.dat = the document knowledge base of project.

In a three layers application, the knowledge base may contain Lines, Blocks and Pages objects. Each object described in the knowledge base has structural descriptions (labeled with a "#") and relational description (labeled with a "*") in the form

```
#P page1
*B block1
*B block2
*X
#B block1
*L line1
*L line2
*L line3
*X
#L line1
*X
#L line2
*X
#L line3
*X
```

The format of the entry in the knowledge base for the structural description of an object is:

```
# object-code name parameters
    where: code is L for line,
           B for block,
           P for page;
        name is the name selected in the training
program; and
        parameters are the structural characteristics
of the objects (line, block, page).
* object-code name parameters
    where: code is L for line,
           B for block,
           P for page,
           X indicating the end of a
structure;
        name is the name of the object; and
        parameters are the relational
characteristics of the objects.
```

Parameters Description:

The parameters are assigned automatically by the learning and correction program 12. When an object (line, block or page) is selected by the operator, the object will be created in the document knowledge base 8 with the following parameters of the area selected in the document:

Param1 is the probability of occurrence 0–100, assigned upon selection of one of the frequency in the learning program;

Params2, 3 & 4 are the possible class/subclasses for the objects;

Param5 is the height of the object in 1/10 mm;

Param6 is the possible deviation in + or − 1/10 mm of the height;

Param7 is the weight of evidence of height in recognizing the object;

Params8, 9 & 10 are the length, deviation and weight of evidence for length in 1/10 mm;

Params11, 12 & 13 are the number of sub-objects, deviation and weight of evidence for sub-objects;

Params14, 15 & 16 are the graphic type, deviation and weight of evidence of the type; and Params17, 18 & 19 are the texture parameters.

The format of the entry in the document knowledge base 8 for the relational description of an object is:

---
* object-code name parameters
  where: object-code is L, O, P; and
  name is the object label
---

Parameters Description:

Param1 is the weight of evidence to apply if the object is not present;

Param2 is the weight of evidence to apply if the object is present;

Param3 is the name of the object for the relation evaluation or the word absolute if the absolute position is used;

Params4 & 5 define the starting and ending points of the relation as top left or bottom left;

Param6 is the Y distance in 1/10 mm;

Param7 is the deviation possible on that distance in 1/10 mm;

Param8 is the weight of evidence assigned to the Y distance;

Params9, 10 & 11 are the X distance, deviation and weight of evidence assigned to the X distance or the sum of evidence for X and Y if Y is 0; and Params12, 13 & 14 are reserved for the automatic learning and correction program 12.

2. Example of a Three Layers Knowledge Base for a Document Letter.

The document knowledge base 8 of the presently preferred embodiment may be represented in a text format and is reproduced in this Appendix, below. The document knowledge base describes a single page document called "Letter" 401, having several sub-classes of letters called "Nagog, Berry, CAP" etc. 402. The class "Letter" and each sub-class contains generic blocks 404 and specific blocks 405. Each block additionally containing lines 406. The class "Letter" is described by its probability of existence among all possible documents 407, the possible sub-classes 408), its physical dimensions 409, deviation 410, evidence 411 and the number of possible blocks of information 412, followed by all the generic blocks that "Letter" could possibly contain 413.

The sub-class letter "Nagog" is defined by the same characteristics 414 as the class "Letter" plus additional blocks which will identify it as a sub-class Nagog (i.e., as a letter from a company called Nagog) 415. Each of the generic blocks within "Letter" such as "Header," is furthermore described 416 by its probability of existence 417, its evidence or disevidence 418, its absolute or relative positioning in "Letter" 419, the X and Y coordinates of this position 420 with deviation 421 and evidence weight 422 plus some additional parameters 423. Likewise, in another layer, the object "Header" 424 is described by its possible subclasses 425, its physical dimension 426, deviation 427, evidence weight 428, followed by the number, deviation and weight of evidence of the line 429 and type 430 parameters.

In the presently preferred embodiment, the system uses a single symmetric deviation and a single texture characteristics. However, other deviations and texture characteristics could be used within the scope of the invention.

Each line within the object "Header" is further defined 431 by its probability of existence 432 within "Header," the weight of evidence assigned to line 433, the absolute or relative positioning within the block 434, and the X and Y coordinates of this position 435.

Finally, the individual lines are described 436 by their possible subclasses which in this cases could be words 437, the physical dimensions 438, deviation 439 and weight of evidence of the parameter 440, followed by the number, deviation and weight of evidence for the words 441 and type 442 parameters.

In a similar fashion a specific line 443 is described by its specific sub-classes 444, the physical dimensions, deviation and weight of evidence 445 followed by the words 446 and type 447 parameters.

APPLICATION EXAMPLE

A letter from a company called "Day, Berry and Howard" is used as an example to show how the program works. A document knowledge base is created following the rules described above. The knowledge base is shown below.

The knowledge base contains the description of the document "Letter," the possible blocks of information within "Letter" and a specific sub-class of letter called "Day, Berry and Howard."

The document knowledge base 8 may be coded manually or created automatically with the learning and correction program 12.

A letter is thus described as a document which has a 30% of occurring among all the documents processed 501, can have unrestricted sub-classes 502, the expected length is 274.0 mm 503 with a deviation of 20.0 mm 504 and a width of 212.5 mm 505 with a deviation of 20.0 mm 506, the weight of evidence provided by this dimension parameter in recognizing a letter is low and +3 and +2 are used on a scale of −100 to +100 507.

The number of possible blocks of information in "Letter" is 20 508 with a deviation of + or − 10 509. The weight of evidence assigned to this criteria is also set at a low of 5 510.

All the possible generic blocks of information in a letter are described. A letter can contain a letter head, an address, a date, the subject or title, a Dear Sir introduction, several blocks of text, the name of the sender, the signature and some qualifier to the sender such as title.

Each of these generic blocks is described and their possible absolute and relative positions in the letter are entered in the document knowledge base 8. The generic block of information called "header" 511 is defined as a block that has any number of sub-classes 512. Its physical dimensions are 30.0 mm high 513 with a deviation of 18.0 mm 514 and 100.0 mm long 515 with a possible deviation of 70.0 mm 516. The weight of evidence of these characteristics in recognizing header is 30 517, the number of possible lines in header is 2 518, with a deviation of 2 519 and a weight of evidence of 5 520. The type of header is 2 which is graphic 521, with a deviation of 1 522 and a weight of evidence of the type parameter being 10 523.

The letter head is furthermore described as a block of information within "Letter," the weight of evidence created by its presence in recognizing a letter 524 is not very significant at 15, its absolute position from the top left corner of the page 525 is 15.0 mm below the top edge 526 with a possible deviation of 15.0 mm 527 giving it if found a high weight of evidence of 90 528 and may be located at 80.0 mm from the left edge 529 with a deviation of 80.0 mm 530 giving a weight of evidence in recognizing a header of 40 531, and a certainty parameter used in the learning program of 30 532.

The letter head ("header") is further defined by its relative position to other possible objects in the page. "Header" is defined as being situated in relation to a location 533 43.0 mm above 534 with a possible deviation of 30.0 mm 535 and anywhere within + or −130 mm to the right or left 536. The weight of evidence provided by this information is 50 537.

"Header" is further defined by the lines it may contain 538. In this case the line is described as a "logo" 539 with a probability of occurrence within "header" of 80% 540, a weight of evidence in identifying "header" of 15 541, with an absolute position from the top left corner of "header" 542 of 0.0 mm 543 and a very high weight of evidence of 95 544.

"Logo" itself is described in the lowest layer of the knowledge base 545 as a line with any possible sub-class 546 of a height of 20.0 mm 547 with a deviation of 10.0 mm 548 and a length of 50.0 mm 549 and a deviation of 40.0 550 and a total weight of evidence for the dimensions of 50 551, the line "logo" is of type 2 which is a graphic 552 having no word in it.

After the generic description for the document "Letter" has been created, it is necessary to create the sub-classes. For example, the letter can come from various companies called "Nagog," "Berry" and "Filenet." To define the sub-classification criteria, between each of these letters, a block of information in the letter is selected that is the most representative of the uniqueness of the sub-class of the document. In the case of a letter, it is usually the company name, logo and other preprinted information on the company's letterhead stationary.

A special "Letter" description is created in the document knowledge base for all letters from a specific company 553. In the case of the company "Day, Berry and Howard," the unique characteristic is the name of the company printed in the form of a logo in the upper left hand corner. The letter "Day, Berry and Howard" 554 is described as a letter with a probability of occurrence of 10 among all the letters processed 555 with the standard characteristics of a letter. No description is needed since the document class has been identified as "Letter" prior to the search for the sub-class "Day, Berry and Howard."

It is additionally necessary to describe the specific objects which are the unique characteristics of the letter from "Day, Berry and Howard" (556). The specific block "!Berry" replaces 557 the generic block header 558 and has a more restrictive position of 15.0 mm from the top of the page 559 with a deviation of 5.0 mm to cope with scanner and photocopier distortion 560. It is located 27.0 mm from the left edge of the page 561 with a deviation of 5.0 mm 562 and the weight of evidence when finding such a block in such a precise location is very high in identifying the letter from "Day, Berry and Howard" 563. The specific block "!Berry" 564 is also defined as a block with any possible sub-class 565, but with very specific physical dimensions of 19.0 mm height 566 and a narrow deviation of 0.2 mm 567 as well as a width of 69.0 mm 568 with a deviation of 0.3 mm 569. The combined weight of evidence of these dimensions is a high 80 570. "!Berry" is a logo of graphic type 2 571 and has a possibility of 3 lines 572.

The specificity of this description, associated with the precise location of the block "!Berry" in the page makes it virtually certain that the letter from "Day, Berry and Howard" will be identified as coming from that company when selected from the group of all possible letters.

---

THREE LEVEL KNOWLEDGE BASE:

GENERIC PAGE OR DOCUMENT DESCRIPTION (401)

| #P | letter | (407) 30 | (408) any | any | any |
|---|---|---|---|---|---|
| | (409) 2740 | (410) 200 | (411) 3 | 2125 | 200 | 2 |
| | (412) 20 | 10 | 5 | 0 0 0 | | |

Generic Block Description with Letter (413)

| | (416) | (417) | (418) | | (419) | |
|---|---|---|---|---|---|---|
| *O | header | 0 | 15 | absolute | topleft | topleft |
| | (420) 150 | (421) 150 | (422) 90 | | 800 800 | 40 |
| | (423) 30 | 0 | 0 | | | |
| *O 300 | header 0 | 0 | 15 | address | botleft | topleft −430 |
| 0 | 1300 50 | 30 | 0 | 0 | | |
| *O 250 | header 0 | 0 | 10 | top | botleft | topleft −750 |
| 0 | 1300 40 | 30 | 0 | 0 | | |

SPECIFIC PAGE OR DOCUMENT DESCRIPTION (402)
Letter from company Nagog (414)
letter 10 Nagog any any 2740 200 5
2125 200 5
0 0 0 0 0

Specific Block description within letter (415)

| *O 20 2800 | !nagogh 0 50 | 0 40 replace 80 | header 0 0 | header 0 | 80 |
|---|---|---|---|---|---|
| *O 20 600 | !nagbot 0 30 | 0 40 replace 80 | any 0 0 | any 0 | 2500 |
| *O 20 750 *X | !nagbo2 0 30 | 0 30 replace 80 | any 0 0 | any 0 | 2600 |

BLOCK DESCRIPTION

Generic Block Description (404)

| | (424) | | (425) | | | |
|---|---|---|---|---|---|---|
| O | header | any | any | any | | |
| | (426) 300 | (427) 180 | (428) 15 | | 1000 | 700 15 |
| | | (429) 2 2 | 5 | | (430) 2 1 | 10 |

Line Description within block Header (431)

| | (432) | (433) | | (434) | |
|---|---|---|---|---|---|
| *L | logo | 80 | 15 | absolute | topleft | topleft |
| | | (435) 0 | 0 | 0 | 0 | 0 95 |

Specific Block Description (405)
O !nagogh any any any 125 20 25
1475 60
30 2 0 15 3 1 14

LINES DESCRIPTION (406)

-continued
THREE LEVEL KNOWLEDGE BASE:

Generic Line Description (436)

|    |        |     | (437) |     |     |     |     |
|----|--------|-----|-------|-----|-----|-----|-----|
| #L | midget | any | any   | any |     |     |     |

|    |    | (438) | (439) |    | (440) |     |     |    |
|----|----|-------|-------|----|-------|-----|-----|----|
|    |    | 25    | 5     |    | 20    | 100 | 50  | 30 |

|   | (441) |    |
|---|-------|----|
|   | 0     | 40 |
| 1 |       |    |
|   | (442) |    |
| 5 | 4     | 10 |

Specific Line Description (443)

|    |        |     | (444) |     |
|----|--------|-----|-------|-----|
| #L | lnagog | any | any   | any |

|    | (445) |    |      |     |    |
|----|-------|----|------|-----|----|
| 60 | 10    | 40 | 1420 | 100 | 50 |

|   | (446) |    |
|---|-------|----|
| 4 | 8     | 10 |
|   | (447) |    |
| 0 | 100   | 5  |

---

DOCUMENT KNOWLEDGE BASE FOR "LETTER"
PAGE DESCRIPTION FOR LETTER

|    |        | (501) |     | (502) |     |     |
|----|--------|-------|-----|-------|-----|-----|
| #P | letter | 30    | any | any   | any |     |

|    | (503) | (504) |   | (505) | (506) | (507) |
|----|-------|-------|---|-------|-------|-------|
|    | 2740  | 200   | 3 | 2125  | 200   | 2     |

|   | (508) | (509) |   | (510) |   |   |   |
|---|-------|-------|---|-------|---|---|---|
|   | 20    | 10    | 5 |       | 0 | 0 | 0 |

|    |        |   | (524)       | (525)   |         |
|----|--------|---|-------------|---------|---------|
| *O | header | 0 | 15 absolute | topleft | topleft |

|    | (526) | (527) | (528) | (529) | (530) | (531) |
|----|-------|-------|-------|-------|-------|-------|
|    | 150   | 150   | 90    | 800   | 800   | 40    |

|   | (532) |   |   |
|---|-------|---|---|
|   | 30    | 0 | 0 |

|    |        |   | (533)      |         |         |
|----|--------|---|------------|---------|---------|
| *O | header | 0 | 15 address | botleft | topleft |

|   | (534) | (535) |   |   | (536) | (537) |
|---|-------|-------|---|---|-------|-------|
|   | −430  | 300   | 0 | 0 | 1300  | 50    |

|   |   | 30 | 0 | 0 |
|---|---|----|---|---|

BLOCK DESCRIPTION FOR HEADER

|    | (511)  |     | (512) |     |
|----|--------|-----|-------|-----|
| #O | header | any | any   | any |

|   | (513) | (514) |    | (515) | (516) | (517) |
|---|-------|-------|----|-------|-------|-------|
|   | 300   | 180   | 15 | 1000  | 700   | 15    |
|   |       | (518) |    | (519) | (520) |       |
|   |       | 2     |    | 2     | 5     |       |

|   |   | (521) | (522) | (523) |
|---|---|-------|-------|-------|
|   |   | 2     | 1     | 10    |

Line description within Header (538)

|    | (539) | (540) | (541) | (542)    |         |         |
|----|-------|-------|-------|----------|---------|---------|
| *L | logo  | 80    | 15    | absolute | topleft | topleft |

|   |   | (543) |   |   | (544) |   |    |
|---|---|-------|---|---|-------|---|----|
|   |   | 0     | 0 |   | 0     | 0 | 95 |

|   | 0 | 0 | 0 |
|---|---|---|---|

LINE DESCRIPTION FOR LOGO

|    | (545) |     | (546) |     |
|----|-------|-----|-------|-----|
| #L | logo  | any | any   | any |

| (551) |   | (547) | (548) |    | (549) | (550) |
|-------|---|-------|-------|----|-------|-------|
| 50    |   | 200   | 100   | 30 | 500   | 400   |

|   | (552) |    |
|---|-------|----|
| 2 | 1     | 10 |

|   | 0 | 0 | 0 |
|---|---|---|---|

SPECIFIC LETTER DESCRIPTION FROM COMPANY DAY, BERRY AND HOWARD (553)

|    | (554)  | (555) |       |     |      |     |   |
|----|--------|-------|-------|-----|------|-----|---|
| #P | letter | 10    | Berry | any | any  |     |   |

|   |   | 2740 |   | 200 | 5 | 2125 | 200 | 2 |

|    | (556)  | (557)        | (558)  |        |
|----|--------|--------------|--------|--------|
| *O | !berry | 0 60 replace | header | header |

|   | (559) | (560) |    | (561) | (562) | (563) |
|---|-------|-------|----|-------|-------|-------|
|   | 150   | 50    | 20 | 270   | 50    | 99    |

|   | 0 | 0 | 0 |
|---|---|---|---|

SPECIFIC BLOCK IDENTIFYING THE LOGO OF DAY, BERRY AND HOWARD

|    | (564)  |     | (565) |     |
|----|--------|-----|-------|-----|
| #O | !berry | any | any   | any |

|   | (566) | (567) | (568) |     | (569) | (570) |
|---|-------|-------|-------|-----|-------|-------|
|   | 190   | 20    | 40    | 690 | 30    | 40    |
|   |       |       | (571) |     |       |       |
|   |       |       | 2     | 0   | 10    |       |

|   | (572) |   |   |
|---|-------|---|---|
|   | 3     | 0 | 9 |

---

APPENDIX E—Example of the Operation of the Invention

In order to better explain the operation of the presently preferred embodiment of the invention a single document is followed through the system using the document knowledge base shown in this Appendix G, below.

A letter from "Day, Berry and Howard," FIG. 10 is scanned with a digital scanner 1, and stored in bitmap format in the RAM portion of the memory of the computer 5.

The segmentation program 6 is initiated and the first line starting from the top of the memory (i.e top of the page) is analyzed. Since this is a complete blank line, it is bypassed by the program. The next line is fetched, then the next until a line is found containing data, i.e., containing black pixels. This line is the top of an area representing the name "Berry." When the program encounters the first black line, the histogram of the line is calculated. Since the black line has a minimum length 2.5 mm, the program sets an "open area" trigger. This means that a significant area has been encountered area segmentation will begin.

The segmented area is extended until the program encounters an area which meets its criteria for closing the area. In this case it will be a blank area under the first word Day. The program then retracts back to the beginning of the area segmented and tests the value of the histogram for a minimum threshold representing the end of an horizontal area. The area segmented is then added to the list of the segmented areas.

The program then finds the first line representing the top of the address: One Post Office Square, and fetches the next lines until it meets its criteria for closing this area first vertically and then horizontally. The program continues this process until it has segmented all the words and all the sentences in the page. After this, the program attempts to regroup areas which are located close to each other or are overlapping and for which the graphic type is identical. In our example, the three words "DAY," "BERRY" and "HOWARD" will be regrouped into one area, the several lines of the company address will be grouped together, and so on down the page, reducing the number of segmented blocks to areas which could have a logical significance when the labeling phase occurs.

If appropriate to the application, the execution knowledge base may be given a different rule which does not regroup segmented lines of the same type if composite objects will be used in the matching and labeling program. The information resulting from each segmentation is written in the segmentation parameters file 7 and consists of a pointer to the specific location of the area segmented and the physical characteristics calculated from that area. For example, the record for the company logo "DAY, BERRY AND HOWARD" would be stored as:

AREA1,200,300,40,690,2 to reflect the X and Y coordinates of the location, the height, the length of the area and the type of data it contains. No actual images is written to the segmentation parameters file 7, only parameters.

For each segmented area a pointer is also created to reflect the relationship between that area and the area it has been grouped with. In this example, there will be a pointer between the area representing the word "DAY" in the lowest layer of the document and the area "DAY, BERRY and HOWARD," in the next higher logical layer in the document. (If the depth of segmentation selected in the execution knowledge base is "WORD," If the depth selected was "LINE," it would only contain the parameters of the line "DAY, BERRY and HOWARD.")

The matching and labelling program 9 then attempts to place a label on each of the areas that were segmented by the segmentation program 6. The data record representing each segmented area is read into short term memory (STM) from the segmentation parameters file 7 and compared to the objects defined in the document knowledge base 8. Starting with the lowest layer "Line" the program processes the segmented areas which are lines. Beginning in the segmented area block which contains the addressee information, the program tries to find a match between the first segmented line area "Hank Allard" and the various line objects described in the document knowledge base.

The line "Hank Allard" is represented in the segmentation parameters file 7 by the record:

Line10,800,300,30,230,1 which means that the line is located 80.0 mm from the top, 30.0 mm from the left edge, is 3.0 mm high and 23.0 mm long and has a graphic type 1 which is "typed characters." By comparing each of the line objects in the document knowledge base such as "Midget," "Short," "Medium," etc. 600, the program concludes that "Short" 601 is the best match because each of the characteristics of "Short" more closely match the segmented line than any other described. To achieve this match, the program takes the first physical characteristic of "Short" 602 which is height 25.0 mm with a deviation 603 of 7 and compares it to the first characteristic of the segmented line which is 23.0. This falls within the acceptable range and thus the weight of evidence associated with this characteristic 604 is taken into consideration for a value of 20.

The program does the same for width 605 where the description in "Short" is 35.0 mm with a deviation 606 of 15.0 mm.

The segmented line having a length of 23.0 mm, the weight of evidence 607 is accepted for 30, and so on for the other characteristics, number of words and graphic type 608.

The result is a global weight of evidence for this area that it could be the line "Short" having a sum of evidence of the structural characteristics: 20+30+30+10=90. The area is also matched to all the other possible lines, calculating the weight of evidence and ranking the lines matched according to the highest evidence. All those which meet a minimum threshold are kept for further processing in case "Short" must be abandoned later because of other incompatibilities. As the best choice in this case, "Short" is used as the pre-label hypothesis which will be verified at the next layer. If the hypothesis were found to be incorrect, the program choose the next best match and use that as the hypothesis.

The whole segmented block area representing the addressee is determined to be composed of 4 lines prelabeled as one Short and three Short or Medium lines. This group of lines is matched to block objects described in the Block layer 610 of the document knowledge base 8. Using its focus of attention routine, the matching and labeling program 9 selects the object with the best probability of matching the segmented area. Block "Address" 611 is selected as a possible match. The segmented area's parameters are:

AREA3,150,750,800,300,4,1 meaning that the area is 15.0 mm high by 75.0 mm long and is located 80.0 mm from the top and 30.0 mm from the left edge; it has 4 lines of the type 1. When matched against the block object "Address," in the document knowledge base 8, the segmented area will match the criterias of height, width, number of lines and type, giving it a weight of evidence toward recognizing "Address" of 10+15+20+15=60.

The program then verifies if the lines contained in the segmented area match those described in the block "Address."

The first line of the "AREA3" is a "Short," which matches the description in "Address," which expects a "Short" line 612 in absolute position 613 between 0.0 mm and 4.0 mm 614 from the top left corner 615 of Address and between 0.0 mm and 100 mm from the left edge 616.

The second line in "AREA3" is a "Medium," but the weight of evidence of "Short" was second best. Since no match was found with "Medium," the program tries its second best match "Short" and finds a match located right under the first "Short" line 617. The second line in address was described by its relative position to the first "Short" line 618. The program checks this relation between 2.5 mm and 7.5 mm under the first line 619 and 0.0 mm and 10.0 mm to the left of the first line 620, and finds a match for a second and a third and a fourth "Short" line, but does not find a match for "Midget" 621 since the Zip Code in this case is part of the fourth line.

The matching and labeling program accumulates all the evidence according to its algorithm, sometimes ADDing, sometimes ORing, and assigns a final weight of evidence for "AREA3" as being the block object "Address." The program then repeats the same process with all the other block objects in the document knowledge base 8, having sufficient matching potential, and creates a ranking of all possible object types for "AREA3." "AREA3" is ultimately pre-labeled as "Address" as its comparison with "Address" resulted in the highest weight of evidence.

After all segmented block areas at the second layer have been pre-labeled, the program moves to the third layer, "Page." In this example, after doing the same type of comparison described above, the program pre-labels blocks found in the page as "Header" 625, "Date" 626, "Addressee" 627, "Subject" 628, "DearSir" 629, "Text" 630, "Sender" 631, "Signature" 632 and "Qualifier" 633.

The program then attempts to identify the document as being a "Letter". A letter 640 is a document which is 274.0 mm by 212.5 mm 641 with 10 to 30 blocks of information 642. This is acceptable for the match with the document under consideration, so the program checks if the absolute and relative position of each block matches the criteria defined in the document knowledge base 8 for a letter. In the case of "Address," the area which has been pre-labelled "Address" matches with its description in the document "Letter" 643. In "Letter," "Address" is described as an area located first in absolute position 644 from the top left corner of the page 645, between 41.5 mm to 104.5 mm from the top 646 and between 23.6 mm and 54.8 mm from the left side of the page 647. Since "AREA3" was found equivalent to:

AREA3,150,800,800,300,4,1 which is 80.0 mm from the top and 30.0 mm from the edge, "AREA3" is determined to be an acceptable address. The program then checks the other absolute and relative acceptable positions of "Address" compared to other blocks. For example, it checks "Address'" relative position to "Header." An acceptable relative position to "Header" 648 is 45.0 mm under "Header" with an acceptable deviation of 35.0 mm 649 and located almost anywhere on the horizontal axes (−120.0 mm to +120.0 mm) 650. The area pre-labelled "Address" is located 55.0 mm under the area pre-labelled "Header," so this relation is acceptable and the evidence of the document being a letter is increased by the fact that "Address" is located at correct absolute position and at a correct relative position to the block "Header."

The same comparisons are made between all the block areas in the page, checking their relative locations against the object block locations in the document knowledge base. A general weight of evidence is generated as to whether the document in question is in fact a "Letter" or one of the other documents which, in a more complex example, would have been entered into the document knowledge base. A ranking is established based on the weight of evidence and the highest selected if it reaches a minimum threshold of evidence of 50.

The threshold is reached in this example and the hypothesis of "Letter" is selected. A verification process, similar to that described above, is then applied to make sure that there are no incompatibilities resulting from this label.

After verification, the class "Letter" is assigned to the document from "DAY, BERRY and HOWARD." The program then determines if the letter can be assigned a sub-class. In the document knowledge base, several possible sub-classes have been defined for the document "Letter." They are "Nagog," "Berry," and "Filenet" 651. Each of these sub-classes of "Letter" is defined by a specific object representing the dominant identification characteristic of the sub-class. In the case of the letter "DAY, BERRY and HOWARD," the presence of a very specific block in large bold characters located at the top of a letter in a very precise location is be enough to identify this company.

The program tries to match a block which is a "Header" located between 10.0 mm and 20.0 mm from the top and 22.0 mm to 32.0 mm from the left edge of the page with the object "!Berry" 651. The object "!Berry" is precisely described in the document knowledge base as an block 19.0 mm high 652, with a deviation of 2.0 mm 653 and a length of 69.0 mm 654, with a deviation of 3.0 mm 655, of the graphic type 2, having 3 words 656. When a match is found with "Header" in the document processed, a very high weight of evidence is given to this finding 657 and the document is assigned the sub-class "Berry."

The document processed is thus correctly identified as being in the class "Letter" and sub-class "Berry" without any human intervention.

The creation of the parameters in the document knowledge base for sub-class identification is done by selecting, in a representative document, the images of the objects of significance, the objects and their precise location in the document are very accurate. This results in very accurate and fast matches for the sub-classification of documents.

During the above processes, all the different blocks of information in the letter were assigned a label. Thus the blocks may be displayed by the retrieval and execution program 11 by asking for them by their labels. For example, after a group of documents have been classified by their classes and sub-classes, one could request the display of the blocks "Address" and "Date" for all the documents in the class/subclass "Letter"/"Berry" to obtain a table of contents of that particular file.

Execution Knowledge Base for "Letter"

The execution knowledge base 15 is composed of three files which are loaded into the program at the time of program execution. The strategy, policy and action to be taken by the program are defined in these files by parameters.

Strategy parameters are used to apply prior knowledge about the environment or the application to the program and are used to simplify or optimize the segmentation and matching processes. The strategy defines the type and sequence in which the operation or knowledge source are applied to the document. The default strategy involves every layer and every process and represents the knowledge source.

Segmentation strategies define the size and location of the segmentation area, the skew correction strategy, the level and the direction of the segmentation process.

```
Segmentation Strategy File Format:
#S WINDOW     20 20 2080 1000
defines the area of the document to be
segmented. Units are expressed here in .1 mm
    Param 1 is the x origin
          2 is the y origin
          3 is the width of the window
          4 is the height of the window
if the window exceed the document size the document
is truncated,
if WINDOW is not defined the full document is taken
by default.
#S SKEW      0
define the operation level for the skew calculation
    Param 1 is the operation level
          0 no skew calculation
          1 skew calculation
          2 redo if skew calculation >
            skew policy 1
          3 redo a second time if second
            skew > skew policy 2
if SKEW is not specified level is 0.
#S LEVEL     1
define the segmentation level
    1 is the level
          0 segment lines only
          1 segment lines and words
          2 segment lines, words and letter.
#S DIRECT    0
define the direction of segmentation
    1 is direction
          0 top bottom left right
          1 top bottom right left
          2 bottom top left right
          3 bottom top right left
          4 left right bottom top
          6 left right top bottom
          5 right left bottom top
          7 right left top bottom
if no DIRECT is specified the direction is set
at 0.
```

The matching and labelling strategy however permits to reduce the search space and to focus on a solution faster.

Since the document processed is presumed to have characteristics defined in the document knowledge base, the best sequence of processes can be selected for each document class/subclass. Thus in the execution knowledge base, each class/subclass of document can have its own search strategy attached to it

```
Matching and Labeling Strategy File
#S NAME    defines class or sub-class name
#CODE Param1,Param2,Param3,Param4
Where CODE can be:
IF,DO,NOT,ENDIF,ELSE,ENDELSE,QUIT,MAKE
Param1 is the document knowledge base layer :
LINE, BLOCK,PAGE etc . . .
Param2 is the knowledge source or process selected
STRUCT,POS,RELAX,CREATE,DISCOVER,CLEAR,
VERIFY
Param3 is the name of the Object
NAME,ALL
Param4 is an operator and/or position
coordinates
Example of Default Strategy :
DO L STRUCT ALL
DO L STRUCT N1
DO L STRUCT N2
DO O CREATE ALL
DO O STRUCT ALL
DO O DISCOVER ALL
DO P STRUCT ALL
DO P POS ALL
D P RELAX ALL
```

The policy file of the execution knowledge base defines the level of thresholds to be used for decision making in the segmentation and matching/labelling programs.

```
Policy definition for segmentation.
#P SKEW     50 50
    define the skew threshold for retry
        1 threshold first pass (0-500)
        2 threshold second pass (0-500)
    if no SKEW policy we set at 50 then 50
#P GAP      50
    define the gap between words to segment in
.1 mm
        1 is the horizontal gap
    if GAP is not specified we set 50.
#P SEGMENT     25 1 10 5
    define the segmentation threshold for area in
.1 mm
        1 top value of vertical histogram
        2 bottom value of vertical histogram
        3 left value of horizontal histogram
        4 right value of horizontal histogram
    if SEGMENT no present we set at 25 15 10 5.
    Policy definition for matching/labelling
```

A level of threshold is applied for each strategic decision making at each layer of the document knowledge base.

The key decision in the matching program are : consider, label, select and tolerate.

The values hereafter are default values.

```
#P Consider  Line 5
             Block 5
             Page 5
```

These are minimum values of weight of evidence to consider an object

```
#P Label  Line 20
          Block 20
          Page 20
These are minimum evidence value to label an
          object
#P Select  Line 50
           Block 50
           Page 50
These are minimum evidence to select a path for
          an object
#P Tolerate  Line 100
             Block 100
             Page
```

These are the amount of deviation tolerated from the current mean deviation in the knowledge base.

Description of the Action code File

The Action code file defines actions to be taken by the retrieval and execution program 11 upon encountering a situation which matches that described in the file. The simplest action code is the PRINT command that describes the print format for each class/subclass of document.

Each document is composed of a block of data:

```
#D class name   document class
   name= any is an action to perform for each document
   name = undef is a block to perform for
      unrecognized document
*B object name label action code action parameter
   * is the data block continuation mark
   B is the type of the object to be found
```

```
L=line, B=block, P=page, T=text
G=graphic, X= end of data
object name is the class of the object
label is the label to be associated with the area
code is the action code to be performed
like   display,test,create   zone,send   to
ocr,delete,request   info   write   text,draw
graphic etc ...
```

Parameter are the parameters associated with the action code.

Example of the Execution Base

```
#D any     perform for all document
*B logohead HEADER 1 2 6 object "logohead"
   label header display at window 2 length 6
*T normal "this is type" 1 7 8
   display text "this is type" in window 7 length
*X end of block
D applicat
   perform for document applicat
*B applicat TITLE 1 10 13
   object applicat label title
   display in window 10 length 13
*B title "title=" 1 14 15
   display text "title=" in
   window 14 length 15
*B name zone 2 200 400 100 100
   create zone in relative position to name
   20.0 mm below and 40.0 mm to the left
   and make it 10.0 mm by 10.0 mm
*B zone test1 4 10
   test the density value of zone to be greater
   than 10 and if yes move zone to test1
*B pause menu 3
   upon encountering the pause command
   display the menu and wait for operator
   command
*X end of block
```

APPENDIX F—The Graphic Knowledge Base

Knowledge base for Identification of Graphic Type
The below knowledge base specifies the type of an area by its content.

```
         the format is
            name     the name of the content type
            c1c2c3   3 values for the type code
            p1p2p3   3 parameters to define the density
            p4p5p6   3 parameters to define the height
            p7p8p9   3 parameters to define the word
length
            parameters are
               1 mean value of the data
               2 maximum deviation of data
               3 evidence weight cotribution
```

```
         codes are
            negative is a non interesting area
            positive is the code for desiarble
   area
```

Example of a graphic Knowledge base:

| GARBAGE | −3 0 0 | 3  | 2  | 70 | 200 | 200 | 0  | 1000 | 500 | 0  |
|---------|--------|----|----|----|-----|-----|----|------|-----|----|
| PRINT   | 1 0 0  | 30 | 10 | 30 | 27  | 4   | 40 | 200  | 100 | 30 |
| HAND    | 0 0 0  | 12 | 7  | 50 | 100 | 60  | 30 | 450  | 300 | 30 |
| THIN    | 4 0 0  | 50 | 20 | 30 | 8   | 5   | 50 | 1000 | 600 | 30 |
| GRAPH   | 2 0 0  | 15 | 5  | 30 | 20  | 5   | 30 | 200  | 150 | 30 |
| SMALL   | −3 0 0 | 30 | 20 | 30 | 5   | 4   | 40 | 20   | 10  | 30 |
| TITLE   | 5 0 0  | 50 | 7  | 40 | 32  | 4   | 40 | 200  | 80  | 20 |

APPENDIX G—COMPLETE KNOWLEDGE BASE FOR LETTER

LINE DESCRIPTION (600)

```
#L   midget    any     any     any  25   5   20
100  50
30    1    0   40    5    4   10  0 0 0

(601)                (602) (603) (604)
#L   short    any    any   any   25    7   20

(605) (606) (607)
                         350   150   30

(608)
                3    1   30     25   15   10   0
0  0
#L   medium   any     any    any  29   10   20
700   300   30   6    3   30   40  20   10   0 0

#L   long    any     any    any  32   10   20
1400  400   30   12   4   30   60  25   10    0 0

#L   horiz   any     any    any   7    7   30
1000   600   30   1    0   40   0  100   10    0 0

#L   lnagog   any    any    any  60   10   40
1420   100   50   4   8. 10    0  100   5     0 0

#L   logo    any    any    any  200  100   30
500   400   20   2    1   10    0    0    0   0 0
*X
```

GENERIC BLOCK DESCRPTION (610)
(611)    (627)

```
#O   address     any     any    any  200   70   10
500   250   15    4    1   20    1    0   15   0 0
0

(612)        (613)    (615)
*L   short        0         5     absolute   topleft
topleft (614)       (616)
             20  20     0   50   50   40
              0   0     0

(617)           (618)
*L   short    0    10     short    topleft   botleft
                          (619)              (620)
              50   25     0   50   50   20
                          0    0

(621)
*L   midget   0   40    short   topleft   botleft   150
25   0  300  200   70    0     0    0
*X
```

```
            (626)
*O    date       any     any     any   40  20  10
300   150   10    1    0    10    1    0  15  0 0 0
*L    short    0    40  absolute   topleft    topleft    0
 0    0   50   50   80    0    0    0
*L    short    0  -40  absolute   topleft    botleft   70
40    0   50   50  -40    0    0    0
*L    horiz    0  -70  absolute   topleft    topleft
 0    0    0    0    0   90    0    0
X*

(632)
#O    signat     any     any     any   200  140   5
500   350   5    1    1   10    0    0   10  0 0 0
*X (625)
O    header     any     any     any   300  180  15
1000  700
15     2     2    5     2    1   10    0    0   0
*L    logo    80   15  absolute   topleft    topleft    0
 0    0

0    0   95    0    0    0

*X (630)
O    text       any     any     any   500  400   5
1500  300   25   8    7    5    1    0   20  0 0
0
*L    long   80   10  absolute   topleft    topleft   200
200    0   50   50   35    0    0    0
*X

#O    column     any     any     any   70   50   30
500   500   15   3    2   10    1    0   10   0 0
0
*X (631)
O    sender     any     any     any   25   15    5
300   150   15   1    1   10    1    0   20   0 0
0
*L    short  80   20  absolute   topleft    topleft    0
 0    0    0    0   30    0    0    0
*X (629)
O    dear       any     any     any   25   15    5
200   150   5    1    0   10    1    0   20   0 0
0
*L    short  80   20  absolute   topleft    topleft    0
 0    0    0    0   20    0    0    0
*X (628)
O    subject    any     any     any   25   15   15
1000  500   15   1    1   20    1    0   25   0 0
0
*L    medium  80   20  absolute   topleft    topleft    0
 0    0    0    0   40    0    0    0
*X

#O    logo      any     any     any    40   10   20
330   30    10    0    2   10    2    0   20    0 0
0
*X (633)
O    qualif    any     any     any    75   50   15
300   200   15    1    1   20    1    0   20    0
0    0
*X

#O    top       any     any     any   400  370   15
1500  300   25   8    7    5    1    0   20    0
0    0

*L    long    80   40  absolute   topleft    topleft    0
 0    0  200  100   40    0    0    0
*X
```

```
#O    refer     any     any     any   80   20   20
750   250   20    0    2   10    1    0   10    0
0    0
*L    short  80   20  absolute   topleft    topleft    0
 0    0    0    0   40    0    0
*X
```

SPECIFIC OBJECT DESCRIPTION

```
#O    !nagogh    any     any     any   125   20   25
1475  60
30     2     0   15    3    1   14    0 0 0

*L    !nagog  60   20  absolute   topleft    topleft    0
 0    0    0    0   80    0    0    0

*L    !nagog  60   20  absolute   topleft    topleft   65
10    0    0    0   80    0
*X

#O    !nagbot    any     any     any   26    5   40
880   25    40    1    0   15    1    1    4   0 0
0
*X

#O    !nagbo2    any     any     any   27    5   40
600   20    40    1    0   15    1    1    4   0 0
0
*X (652)  (653)
O    !berry     any     any     any   190   20
40
              (654) (655)(657)
              690    30    40

(656)
                     2    0   10
                     3    0    9    0    0    0
*X

#O    !FileneA    any     any     any   144   19   30
368   41    36    5    2    6    1    1    5    0    0
0
*X

#O    !FileneB    any     any     any   58    10   30
288   33    36    1    0    6    2    2    5    0    0
0
*X
```

GENERIC PAGE OR DOCUMENT DESCRIPTION

```
    (640)                              (641)
#P   letter   30     any  any  any   2740  200   3
                   2125 200   2
                        (642)
                         20  10   5
                          0   0  0

(643)         (644)      (645)
*O   address    0    15  absolute   topleft    topleft
          (646)     (647)
           730  315   0   392  156   82
           40    0    0

*O   address    0    10  absolute   topleft    topleft   750
400    0 1000   300   40   30    0

*O   address    0     0  absolute   topleft    topleft  2000
800    0 1000  1000   -90   30    0    0

(648)
*O   address   20    25  header    topleft    botleft
               (649)    (650)
                450    350    0    0  1200   35
                30    0    0    0

*O   header    0    15  absolute   topleft    topleft   150
150    90
```

```
800   800   40   30   0   0

*O  header   0   15  address   botleft   topleft   -430
300   0

0   1300   50   30   0   0

*O  header   0   10   top   botleft   topleft   -750
250   0

0   1300   40   30   0   0

*O  address   0   15  absolute  topleft   topleft   730
315   0  392  156  82   40   0   0

*O  date   0   15  absolute  topleft   topleft   625
417   0  842  719  51   40   0   0

*O  date   0   15  address   topleft   topleft   -100
500   0  400  900  45   30   0   0

*O  date   15   top   botleft   topleft   -400
250   0  800  850  45   30   0   0

*O  date   0   dear   topleft   topleft   1000
1002  0  800  850  -90  30   0   0

*O  subject   0   15   dear   botleft   topleft   -80
40   0  200  210  50   30   0   0

*O  subject   0   10  address   topleft   botleft   80
40   0   0  400   60   30   0   0

*O  dear   0   15  absolute  topleft   topleft   950
350  90 400  200  45   30   0   0

*O  dear   0   10   top   botleft   topleft   -70
50   90   0   50   95   30   0   0

*O  dear   0   20  address   topleft   botleft   300
250   0 -500  530   55   30   0   0

*O  dear   0   10   date   topleft   botleft   350
300   0 900  950   55   30   0   0

*O  dear   0   0   dear   botleft   topleft   -300
250   0   0   50   -50   30   0   0

*O  top   0   20  absolute  topleft   topleft   1000
500   30  350  150   50   30   0   0

*O  top   0   20   text   botleft   topleft   100
100   0   0   50   50   30   0   0

*O  top   0   text   topleft   botleft   400
400   0   0  400  -100   30   0   0

*O  top   5   15   dear   topleft   botleft   95
60    0  100  150   70   30   0   0

*O  text   0   15  absolute  topleft   topleft   1500
900   20  350  150   50   30   0   0

*O  text   0   10   text   botleft   topleft   -50
50    0    0   50   60   30   0   0

*O  text   0   10   text   topleft   botleft   200
100   0   0   50   50   30   0   0

*O  sender   0   10  absolute  topleft   topleft   1900
900   30  850  700   30   30   0   0

*O  sender   0   15   text   topleft   botleft   100
70    0  600  800   30   30   0   0

*O  sender   0   10   signat   botleft   topleft   -50
50    0    0  200   60   30   0   0

*O  sender   0   10   qualif   botleft   topleft   -200
100   0    0  100   50   30   0   0

*O  sender   0   0   top   topleft   botleft   -1000
1000   0    0 1500  -90   30   0   0

*O  signat   0   15  absolute  topleft   topleft   1800
600   30 1000  800   25   30   0   0

*O  signat   0   15   text   topleft   botleft   250
200   0  800  950   20   30   0   0

*O  signat   0   10   sender   topleft   botleft   80
80    0    0  200   80   30   0   0

*O  signat   0   top   topleft   botleft   -1000
1000   0    0 1500  -90   30   0   0

*O  qualif   0   10  absolute  topleft   topleft   2000
800   30  950  800   30   30   0   0

*O  qualif   0   15   signat   topleft   botleft   50
50    0    0  200   70   30   0   0

*O  qualif   0   10   sender   topleft   botleft   200
100   0    0  100   40   30   0   0

*O  qualif   0   0   signat   topleft   botleft   300
200   0  900  800  -80   30   0   0

*O  qualif   0   0   top   topleft   botleft   -1000
1000   0    0 1500  -90   30   0   0
*X
```

SPECIFIC PAGE OR DOCUMENT DESCRIPTION (651)

Letter from company Nagog

```
#letter   10   Nagog   any   any 2740 200 5
2125 200 5

0 0 0   0 0 0

*O  !nagogh   0   40   replace   header   header   80
20   0

280   50   80   0   0   0

*O  !nagbot   0   40   replace   any   any   2500
20   0  600   30   80   0   0   0

*O  -!nagbo2   30   replace   any   any   2600
20   0  750   30   80   0   0   0
*X
```

Letter from company Berry

```
#P letter   10   Berry   any   any 2740 200 5
2125 200 2  0 0 0  0 0 0
   (651)

*O  !berry   0   60   replace   header   header   150
50   20  270   50   99   0   0   0
*X
```

Letter from company Filenet

```
#P letter   0   Filenet   any   any 2750 280 25
2134 218  30   18  9  5   0 0 4

*O  !FileneA  100   35   replace   header   header   38
42    0  408   67   90   0   0

*O  !FileneB  100   35   replace   any   logo   671
84    0   80   45   90   0   0   0

*O  !FileneB  100   35  !FileneA  topleft   topleft   633
82    0 -328   61   90   0   0   0
*X
(20209.app)
```

What is claimed is:

1. A computer-implemented process for classifying documents comprising the steps of:

preliminarily creating a knowledge base of documents each characterized by a hierarchy of objects that are defined by parameters indicating physical and relational characteristics, the hierarchy being organized from a lowest object level to one or more successively higher object levels and storing said knowledge base in a computer;

scanning a document to form binary light and dark pixels and inputting into said computer data representing the pixels;

performing, in said computer, the following steps;

segmenting the document into primary areas of significance based on the pixels;

calculating parameters that define the segmented primary areas;

comparing the parameters of each segmented primary area with the parameters of the lowest level objects in the hierarchy of objects that characterize each document in the knowledge base;

assigning to each segmented primary area weights of evidence relative to the lowest level objects based on the comparison;

generating a weighted hypothesis of a label for each of the segmented areas based on the weights of evidence relative to the lowest level objects;

grouping the segmented primary areas into areas of significance more relevant than the primary areas;

calculating parameters that define the more relevant areas;

comparing the parameters of each more relevant area with the parameters of the second lowest level objects in the hierarchy;

assigning to each more relevant area weights of evidence relative to the second lowest level objects based on the comparison and reevaluating the weights of evidence assigned to the segmented primary areas;

generating a weighted hypothesis of a label for each of the more relevant areas and revising the weighted hypothesis of the label for each of the segmented primary areas based on the weights of evidence of the second lowest level objects and the lowest level objects; and classifying the document based on the labels and the weights of evidence developed by the preceding step.

2. The process of claim 1, additionally comprising the steps of:

grouping the more relevant areas into still more relevant areas of significance;

calculating parameters that define the still more relevant areas;

comparing the parameters of each still more relevant area with the parameters of the third lowest level objects in the hierarchy;

assigning to each still more relevant area weights of evidence relative to the third lowest level objects based on the comparison and reevaluating the weights of evidence assigned to the more relevant areas and the segmented primary areas;

generating a weighted hypothesis of a label for each of the still more relevant areas and revising the weighted hypothesis of the label for each of the more relevant areas and the segmented primary areas based on the weights of evidence of the third lowest level objects, the second lowest level objects and the lowest level objects; and classifying the document based on the labels and the weights of evidence developed by the preceding step.

3. The process of claim 2, in which the recited steps are performed one or more additional times with respect to successively more relevant areas of significance and higher level objects, thereby increasing the evidence that supports the document classification.

4. The process of claim 1, additionally comprising the step of forming from the pixels darkness density histograms, the segmenting step segmenting the document based on the histograms.

5. The process of claim 4, additionally comprising the steps of:

comparing the density histograms of one side of the individual objects with the density histograms of the other side of the individual objects;

determining the vertical shift between the histograms of the two sides of the individual objects;

averaging the determined vertical shift of the individual objects; and correcting the skew of an entire edge of the document based on the averaged vertical shift.

* * * * *